US009801093B2

(12) United States Patent
Yang et al.

(10) Patent No.: US 9,801,093 B2
(45) Date of Patent: Oct. 24, 2017

(54) WIRELESS COMMUNICATION SYSTEM AND METHOD, AND DYNAMIC ASSOCIATION CONTROL APPARATUS AND METHOD

(71) Applicant: Hitachi, Ltd., Tokyo (JP)

(72) Inventors: Peng Yang, Beijing (CN); Chunguang Liu, Beijing (CN); Zexi Yang, Beijing (CN); Sheng Zhou, Beijing (CN); Mika Mizutani, Tokyo (JP); Zhisheng Niu, Beijing (CN)

(73) Assignee: HITACHI, LTD., Tokyo (JP)

( * ) Notice: Subject to any disclaimer, the term of this patent is extended or adjusted under 35 U.S.C. 154(b) by 198 days.

(21) Appl. No.: 14/650,491

(22) PCT Filed: Dec. 4, 2013

(86) PCT No.: PCT/CN2013/088529
§ 371 (c)(1),
(2) Date: Jun. 8, 2015

(87) PCT Pub. No.: WO2014/090104
PCT Pub. Date: Jun. 19, 2014

(65) Prior Publication Data
US 2015/0312799 A1 Oct. 29, 2015

(30) Foreign Application Priority Data
Dec. 10, 2012 (CN) .......................... 2012 1 0528202

(51) Int. Cl.
*H04W 28/08* (2009.01)
*H04B 7/155* (2006.01)

(52) U.S. Cl.
CPC ........ *H04W 28/08* (2013.01); *H04B 7/15507* (2013.01)

(58) Field of Classification Search
None
See application file for complete search history.

(56) References Cited

U.S. PATENT DOCUMENTS

| 7,024,186 B1 * | 4/2006 | Ishikawa ............... H04W 16/00 370/252 |
| 2003/0068975 A1 * | 4/2003 | Qiao ..................... H04W 88/04 455/11.1 |

(Continued)

FOREIGN PATENT DOCUMENTS

| CN | 101415207 A | 4/2009 |
| CN | 102714540 A | 10/2012 |

(Continued)

*Primary Examiner* — Duc Duong
(74) *Attorney, Agent, or Firm* — Volpe and Koenig, P.C.

(57) ABSTRACT

It is provided a dynamic association control apparatus comprising: an information acquisition part configured to acquire information related to an object relay node and to candidate base stations to be associated; a blocking probability calculation part configured to calculate respectively a candidate blocking probability in a case where the object relay node performs association with each of the candidate base stations to be associated according to the acquired information; and an association control part configured to select an object blocking probability from the calculated candidate blocking probabilities, and use a base station corresponding to the selected object blocking probability as an object base station to which the association is transferred, so that the object relay node changes to be associated with the object base station to which the association is transferred.

12 Claims, 15 Drawing Sheets

(56) References Cited

U.S. PATENT DOCUMENTS

| | | | |
|---|---|---|---|
| 2003/0069005 A1* | 4/2003 | Casaccia | H04M 3/36 455/414.1 |
| 2012/0003959 A1* | 1/2012 | Gonz lez-Canedo | H04W 72/10 455/411 |
| 2013/0010709 A1* | 1/2013 | Earnshaw | H04L 5/001 370/329 |
| 2013/0163573 A1* | 6/2013 | Oizumi | H04L 5/0007 370/336 |
| 2013/0252620 A1 | 9/2013 | Kobayashi et al. | |
| 2014/0024375 A1* | 1/2014 | Fitzpatrick | H04W 36/30 455/436 |
| 2014/0177840 A1* | 6/2014 | Liu | H04W 28/08 380/270 |

FOREIGN PATENT DOCUMENTS

| | | |
|---|---|---|
| JP | 2000-138627 A | 5/2000 |
| WO | 2004004287 A1 | 1/2004 |
| WO | 2012/016590 A1 | 2/2012 |
| WO | 2012015411 A1 | 2/2012 |
| WO | 2012/081150 A1 | 6/2012 |

* cited by examiner

| NEIGHBORING/RELATED/ASSOCIATED RELAY RECORDING TABLE |||||
|---|---|---|---|---|
| RELAY NUMBER | CHANNEL STATE | ASSOCIATED OR NOT | NEIGHBOURING OR NOT | RELATED OR NOT |
| 401 | 402 | 403 | 404 | 405 |

*FIG. 4*

| BASE STATION/RELAY CHANNEL AND LOAD INFORMATION RECORDING TABLE |||||
|---|---|---|---|---|
| USER NUMBER | ARRIVAL TIME | CHANNEL STATE | TIME LENGTH OF SERVICE | ARRIVAL PLACE |
| 501 | 502 | 503 | 504 | 505 |

*FIG. 5*

WIRELESS COMMUNICATION SYSTEM AND METHOD, AND DYNAMIC ASSOCIATION CONTROL APPARATUS AND METHOD

BACKGROUND OF THE INVENTION

This invention relates to a wireless communication system such as a cellar network system in which relay nodes are deployed, and more particularly, to a wireless communication system, and a dynamic association control apparatus and a dynamic association control method for performing load transfer by using relay nodes.

In recent years, with rapid development of wireless communication technologies, cell area in a cellular network is being zoomed out, and the network load sharply increases, which results in the cell load dramatically varying in time domain and space domain. With such load non-uniformity, on one hand quality of service (QoS) for users in hot cells degrades, and on the other hand resources in non-hot cells are not fully utilized. To address the issue of the degradation of QoS for users in the hot cells, the load within the hot cells needs to be transferred to the surrounding non-hot cells, i.e., the operation of performing load transfer in the network is desired.

For example, Patent Literature 1 (WO2012/016590A1) "DISTRIBUTED LOAD BALANCING IN CELLULAR WIRELESS NETWORKS" discloses a method for transferring load in a cellular network. This method is based on a distributed algorithm, and transfers the load by changing the base station that serves users.

In addition, a relay technology of setting relay nodes which belongs to a base station serving a cell has become one of the widely accepted wireless communication technologies in recent years. In several cellular network standards, the relay technology has been incorporated. The so-called relay node refers to a device that is associated with a base station of a cell corresponding to a range of setting, and is typically deployed at edges of the cell for enhancing signal strength of edge users and extending coverage.

The distributed algorithm disclosed in Patent Literature 1 (WO2012/016590A1) only involves load transfer between users and the base station, but does not involve a relay node.

In addition, Patent Literature 2 (WO2012/015411A1) "SYSTEM AND METHOD FOR MOBILE ACCESS CONTROL AND LOAD BALANCING IN A RELAY NETWORK" discloses a method for transferring load using a relay within a single cell including relay node.

However, this method cannot be applied to a scenario of load transfer between different cells among a plurality of cells. In the cellular network environment, the problems of uneven resource allocation and blocking cannot be solved.

Additionally, Patent Literature 3 (US2003/0068975A1) "Integrated cellular and ad hoc relaying system" discloses a cellular network in which relay nodes are deployed, and reveals that the deployed relay nodes can help transfer load among a plurality of cells. However, no specific algorithm for the relay node to transfer load is given.

SUMMARY OF THE INVENTION

This invention is invented in view of the above problems, and is intended to provide a wireless communication system, and a dynamic association control apparatus and method for performing load transfer by using a relay node so as to implement load balancing and improve quality of service.

In a network, such as a cellular network, where a relay node is present, the relay node acts collaboratively with a cell base station to which the relay node belongs. Since the relay node is typically deployed at a place which is higher and has a better light of sight, the relay node may maintain a good channel state with several surrounding base stations in terms of hardware condition and geographical condition, and it is possible to transfer load by using the relay node.

In this invention, a base station to which a relay node belongs is dynamically assigned by using the above features of the relay node, so that the relay node is not associated with a fixed cell base station as in the prior art, instead the base station associated with the relay node can be changed depending on wireless communication resources, thereby indirectly transferring load of a user terminal served by the relay node.

An aspect of this invention is a dynamic association control apparatus, comprising: an information acquisition part configured to acquire information related to an object relay node and to candidate base stations to be associated; a blocking probability calculation part configured to calculate respectively a candidate blocking probability in a case where the object relay node performs association with each of the candidate base station to be associated according to the acquired information; and an association control part configured to select an object blocking probability from the calculated candidate blocking probabilities, and use a base station corresponding to the selected object blocking probability as an object base station to which the association is transferred, so that the object relay node changes to be associated with the object base station to which the association is transferred.

Another aspect of this invention is a dynamic association control method, comprising: an information acquisition step, for acquiring information related to an object relay node and to candidate base stations to be associated; a blocking probability calculation step, for calculating respectively a candidate blocking probability in a case where the object relay node performs associations with each of the candidate base stations to be associated according to the acquired information; and an association control step, for selecting an object blocking probability from the calculated candidate blocking probabilities, and using a base station corresponding to the selected object blocking probability as an object base station to which the association is transferred, so that the object relay node changes to be associated with the object base station to which the association is transferred.

Another aspect of this invention is a wireless communication method in a wireless communication system which includes base stations and relay nodes associated with base stations, the wireless communication method comprising: respectively acquiring, by the base stations and the relay nodes, information related to their respective communication environment; sending, by the base stations, the acquired information to each relay node which is capable of establishing association with the base stations; and selecting, by the relay nodes, candidate base stations to be associated from base stations except a currently associated base station, respectively calculating a candidate blocking probability when the present relay node performs association with each of the candidate base stations to be associated based on information from the base stations and the acquired information, selecting an object blocking probability from the candidate blocking probabilities calculated by the present relay node, using a base station corresponding to the object blocking probability as an object base station to which the association is transferred, and changing from current association with a base station to association with the object base station to which the association is to be transferred.

Another aspect of this invention is a wireless communication method in a wireless communication system which includes base stations and relay nodes associated with base stations, the wireless communication method comprising: respectively acquiring, by the base stations and the relay nodes, information related to their respective communication environment; sending, by the base stations, the acquired information to each relay node which is capable of establishing association with the base stations; sending, by the relay nodes, the acquired information to base station currently associated with the relay nodes; with respect to a object relay node associated with the base station, selecting, by the base stations, a candidate base station to be associated from base stations except the present base station, and respectively calculating a candidate blocking probability in a case where the object relay node performs association with each candidate base station to be associated based on information from relay nodes and the acquired information, and sending a calculation result to the object relay node; and selecting, by the relay nodes, an object blocking probability from the candidate blocking probabilities, using a base station corresponding to the object blocking probability as an object base station to which the association is transferred, and changing from current association with a base station to association with the object base station to which the association is to be transferred.

According to this invention, a relay node may be dynamically associated with a base station, and thus the relay node is capable of using the same frequency band for transmission as in the original cellular network, thereby saving frequency resources. In addition, in this wireless communication system, blocking probability may be significantly reduced with no need of a central node, and thus the technical effects of implementing balanced load and improving quality of service can be achieved.

BRIEF DESCRIPTION OF THE DRAWINGS

FIG. 4 is an explanatory diagram of a neighboring/related/associated relay recording table in the base station according to the first embodiment of this invention.

FIG. 5 is an explanatory diagram of a base station/relay channel and load information recording table in the base station according to the first embodiment of this invention.

DETAILED DESCRIPTION OF THE PREFERRED EMBODIMENT

Firstly, relation between a base station and a relay node is defined and interpreted. Each relay node is certainly associated with a base station at a given time. Such base station is referred to as an associated base station of the relay node. Likewise, the relay node is referred to an associated relay node of the base station.

Figure 1:
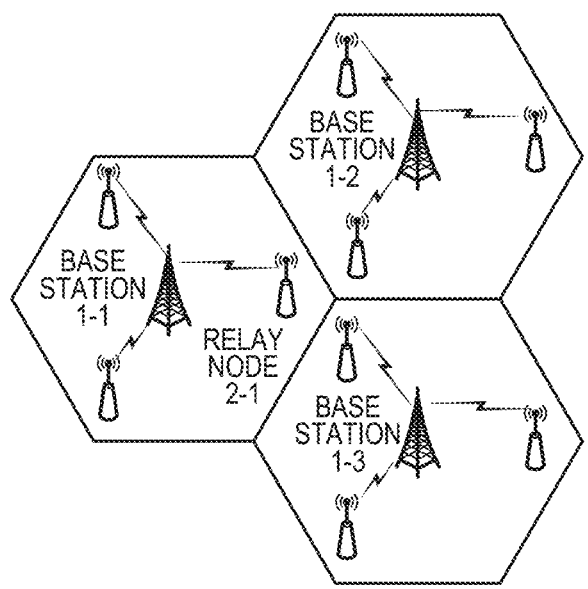
FIG. 1 is an explanatory diagram of a network topology of a wireless communication system according to this invention.

FIG. 1 is an explanatory diagram of a network topology of a wireless communication system according to this invention. FIG. 1 schematically illustrates an example of a network topology including three cells. As illustrated in FIG. 1, a base station 1-1, a base station 1-2, and a base station 1-3 are deployed at central positions of their respective cells, and three relay nodes are deployed in each cell, e.g., a relay node 2-1. In current default cases, each of the base stations 1-1 to 1-3 manages a cell of fixed-area, and relay nodes deployed within range of the cell belong to a base station serving the cell. That is, each relay node is associated with its nearest base station.

In the prior art, a relay node is constantly associated with a fixed cell base station, for enhancing the signal strength of edge users of the specific cell.

While being subjected to restriction of the signal strength, generally one relay node may only select a base station from several surrounding base stations for association, theoretically within a certain range, one relay node is capable of performing signal transfer with the several surrounding base stations. Here, this phenomenon is considered as a case where the relay node has a "neighboring relation" with the several surrounding base stations. A relay node may also be associated with a base station having a neighboring relation with the relay node, and the base station that can perform association with the relay node is referred to as a "neighboring base station" of the relay node. In addition, it may also be determined which surrounding base stations are in neighboring relation with a relay node according to preset rules and conditions, or neighboring base stations of a relay node may also be defined for the relay node.

Based on the above neighboring relation theory, in this invention, it is assumed that in a case where the relay node changes association relation with its associated base station, but establishes association with another neighboring base station having a neighboring relation therewith, and serves the base station with the changed association, blocking probabilities of several cells in the surrounding will change since the load changes. For a certain cell, its blocking probability may be reduced. That is, when the association relation of a relay node changes, the blocking probabilities of base stations in other cells may also be affected. Here, the cells corresponding to the affected base stations are referred to as related cells of the relay node, the base stations corresponding to the related cells are referred to as related base stations of the relay node, and likewise, the relay node is referred to as a related relay node of the base stations. In general, the neighboring base stations are included in the related base stations, and when a relay node changes its associated base station, the relay node has to be associated with one of the neighboring base stations. In addition, the related base stations generally include the associated base station, since the related base station is defined as a base station whose blocking probability may be affected after the relay node changes its association. Therefore, other base stations in the network other than the neighboring base stations may also be subjected to changes of blocking probability because of the interference environment changes due to changing of the association by the relay node. However, for a network having a small coverage and including a small number of cells, the related base stations may also be a set of associated base stations and neighboring base stations.

For ease of description, the neighboring relation and the related relation between the base station and the relay node are both predetermined according to a network topology, and would not vary in time.

Figure 2:
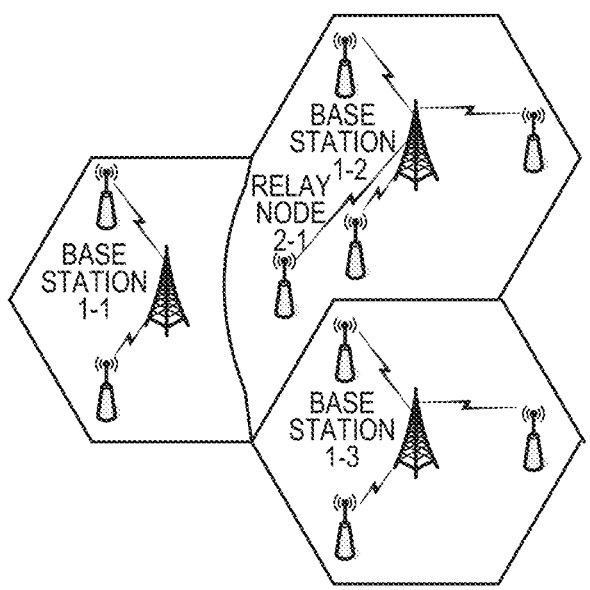
FIG. 2 is an explanatory diagram of a network topology after association relation of a relay node is transferred according to this invention.

In this invention, the relay node may change its association relation with the base station. FIG. 2 is an explanatory diagram of a network topology after association relation of a relay node is transferred from a state in FIG. 1 according to this invention.

As illustrated in FIG. 2, the base station 1-2 and the relay node 2-1 have a neighboring relation. As compared with the state in FIG. 1, the relay node 2-1 associated with the base station 1-1 in FIG. 1 changes to be associated with the neighboring base station 1-2. With such a change of the association relation between the relay node and the base station, coverage of each cell changes accordingly, and the coverage of the cell managed by the base station 1-2 includes the range of enhancing the signal strength by the relay node 2-1. A portion of the cell originally managed by the base station 1-1 is incorporated into the cell served by the base station 1-2. Therefore, the load of this portion also becomes the load of the base station 1-2. In this way, the objective of transferring load is achieved.

To achieve the above load transfer according to this invention, various embodiments of this invention are hereinafter described with reference to the appended drawings.

First Embodiment

Assume that a wireless communication system in a first embodiment includes a plurality of base station 1A and a plurality of relay nodes 2A 1B associated with the plurality of base stations. Each base station 1A has the same internal structure, and each relay node 2A 1B also has the same internal structure.

Figure 3:
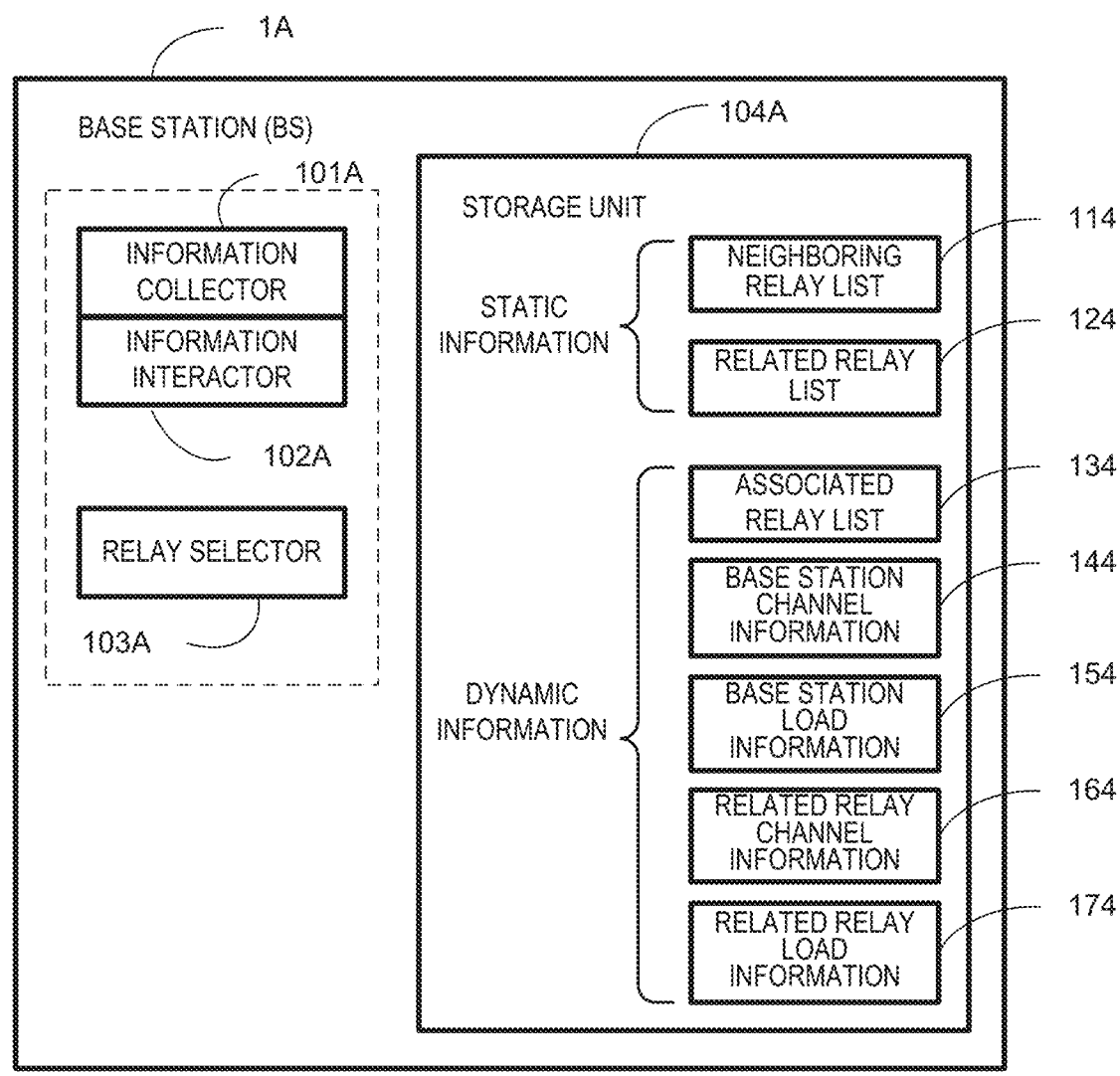
FIG. 3 is a block diagram of an internal configuration of a base station in a wireless communication system according to a first embodiment of this invention.

FIG. 3 is a block diagram of an internal configuration of a base station 1A in a wireless communication system according to the first embodiment. As illustrated in FIG. 3, the base station 1A includes an information collector 101A, an information interactor 102A, a relay selector 103A, and a storage unit 104A.

The information collector 101A is configured to collect channel information and load information of the base station 1A, and store the information into the storage unit 104A. The information interactor 102A is configured to interact information with the relay node to deliver an information message and an instruction message.

The relay selector 103A is an optional component, and is mainly used for a larger-scale wireless communication network. Specifically, since there is a plurality of base stations and a plurality of relay nodes in the network, the impact on blocking probability of a certain base station has an issue of destructive superimposition when a plurality of relay nodes all change their associations. Therefore, the relay selector 103A is arranged in the base station, and the relay selector 103A receives data indicating a change of blocking probability, for example, the most reduction of blocking probability, from the related relay nodes, so as to select a relay node permitting transfer of the association from the data indicating the change of blocking probability, and send acknowledgement information to the selected relay node. The specific process of relay node selection is described hereinafter.

Additionally, when no relay selector 103A is present, the base station does not need to receive the data indicating the change of blocking probability, but directly performs transfer of the association of the relay node.

The information collector 101A, the information interactor 102A, and the relay selector 103A may be implemented by a processor such as CPU and the like to execute a specified program. The information collector 101A and the information interactor 102A are corresponding to the "information acquisition part", and the relay selector 130A is corresponding to the "relay selection part".

The storage unit 104A stores various information needed for the relay selector 103A to select a relay node. Such information may be obtained via the information collector 101A or the information interactor 102A. The storage unit 104A may also be integrated with the information collector 101A or the information interactor 102A.

Specifically, the storage unit 104A stores: a neighboring relay list 114, a related relay list 124, an associated relay list 134, base station channel information 144, base station load information 154, related relay channel information 164, and related relay load information 174. The neighboring relay list 114 and the related relay list 124 are static information, and the associated relay list 134, the base station channel information 144, the base station load information 154, the related relay channel information 164, and the related relay load information 174 are dynamic information. The static information is determined during network initialization, and may not change over time. The dynamic information may change over time, and needs to be periodically updated via information collection or interaction with the relay node.

The neighboring relay list 114 stores a list of relay nodes that can be associated with the base station 1A. The related relay list 124 stores relay nodes that are related to the base station 1A. Here, in a case where the related base stations of a relay node include the base station 1A, the relay node is considered as a related relay node of the base station, and information of the relay node is recorded in the related relay list 124. The associated relay list 134 stores a list of relay nodes associated with the base station 1A. The neighboring relay list 114, the related relay list 124, and the associated relay list 134 may be stored in a unified storage format of a neighboring/related/associated relay recording table as illustrated in FIG. 4.

FIG. 4 is an explanatory diagram of the neighboring/related/associated relay recording table in the base station according to the first embodiment. The neighboring/related/associated relay recording table integrally illustrates the neighboring relay list 114, the related relay list 124, and the associated relay list 134. The table includes: a relay number 401, which indicates the number of a recorded relay node, and is an identifier for identifying the relay node; a channel state 402, which indicates the state of a channel from the relay node identified by the relay number 401 to the base station 1A; associated or not 403, which indicates whether the relay node identified by the relay number 401 is currently associated with the base station 1A; neighboring or not 404, which indicates whether the relay node identified by the relay number 401 can be associated with the base station; and related or not 405, which indicates whether the related base stations of the relay node identified by the relay number 401 include the base station 1A.

In the example illustrated in FIG. 4, the neighboring relay list 114, the related relay list 124, and the associated relay list 134 are integrated in a table. Nevertheless, the associated or not 403, the neighboring or not 404, and the related or not 405 may also be represented in different tables, such that the neighboring relay list 114, the related relay list 124, and the associated relay list 134 are separately recorded.

The base station channel information 144 indicates information of a channel from a user associated with the base station 1A to the base station 1A. The base station load information 154 indicates information of load of the user associated with the base station 1A. The related relay channel information 164 indicates information of a channel of a user associated with the related relay node of the base station 1A. The related relay channel information 174 indicates information of load of the user associated with the related relay node of the base station 1A.

The base station channel information 144, the base station load information 154, the related relay channel information 164, and the related relay load information 174 may be stored in a unified storage format of a base station/relay channel and load information recording table as illustrated in FIG. 5.

FIG. 5 is an explanatory diagram of a base station/relay channel and load information recording table in the base station according to the first embodiment. The base station/relay channel and load information recording table integrally illustrates the base station channel information 144, the base station load information 154, the related relay channel information 164, and the related relay load information 174.

The following items are included: a user number 501, which is an identifier for identifying users at least associated with the base station 1A and associated with the related relay nodes of the base station 1A who are recorded in the base station/relay channel and load information recording table; arrival time 502, which indicates the time when the user identified by the user number 501 arrives at a wireless communication system; channel state 503, which indicates the state of a channel from the user identified by the user number 501 to the base station/related relay node; time length of service 504, which indicates the length of time during which the user identified by the user number 501 is served; and arrival place 505, which indicates the position of the user identified by the user number 501.

In the example illustrated in FIG. 5, the base station channel information 144, the base station load information 154, the related relay channel information 164, and the related relay load information 174 are integrated in a table. Nevertheless, the base station channel information 144, the base station load information 154, the related relay channel information 164, and the related relay load information 174 may also be represented in different tables. In addition, the format and items of the table are not specifically limited, and the items may be added or removed with reference to the prior formats related to the load information and channel information. The information which facilitates selection of the relay node may all be stored into the storage unit 104A.

In addition, the example illustrated in FIG. 5 is equivalent to a format in which each base station/relay node records its own channel information and load information. However, in a case where channel information and load information collected from another base station or relay node are recorded, or in a case where channel information and load information of a plurality of base stations and relay nodes are recorded in a table, an additional item "base station/relay number" is needed to identify which base station/relay node the information belongs to.

Figure 6:
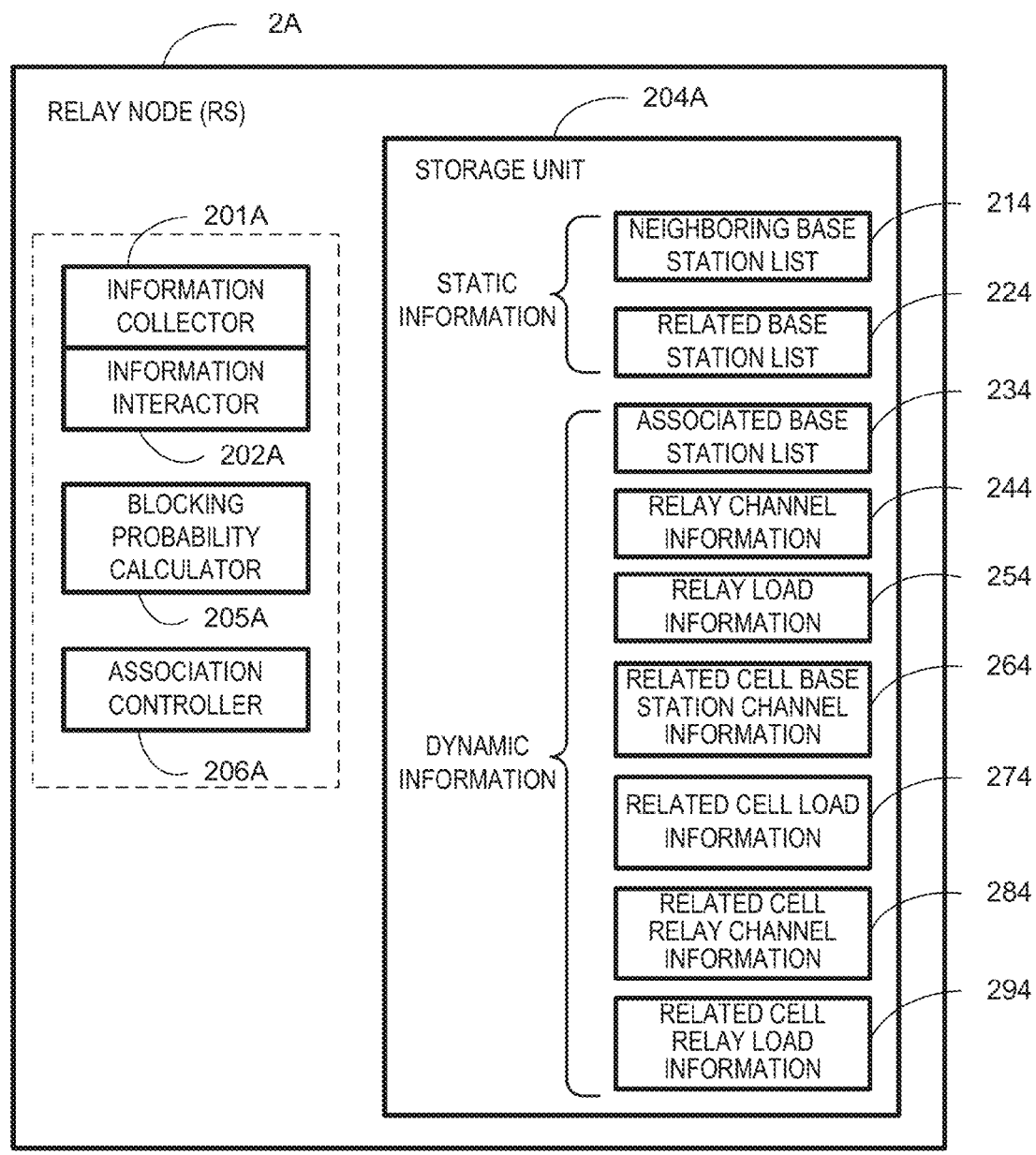
FIG. 6 is a block diagram of an internal structure of a relay node in the wireless communication system according to the first embodiment of this invention.

FIG. 6 is a block diagram of an internal structure of a relay node 2A in the wireless communication system according to the first embodiment. As illustrated in FIG. 6, the relay node 2A includes an information collector 201A, an information interactor 202A, a blocking probability calculator 205A, an association controller 206A, and a storage unit 204A.

The information collector 201A is configured to collect channel information and load information of the relay node 2A, and store the information into the storage unit 204A. The information interactor 202A is configured to interact information with the related base stations to deliver an information message and an instruction message.

The blocking probability calculator 205A is configured to: select candidate base stations to be associated from base stations except the current associated base station according to the information collected by the information collector 201A and the information acquired by the information interactor 202A from the base station 1A, simulate the scenario where a candidate base station to be associated performs association with the present relay node 2A, and respectively calculate a reduction of blocking probability of a candidate blocking probability as compared with the current blocking probability when the relay node performs associations with each of the candidate base stations to be associated. The specific calculation process is described hereinafter.

The association controller 206A is configured to: select the most reduction of blocking probability from the reductions of blocking probability calculated by the blocking probability calculator 205A, and use a neighboring base station corresponding to this reduction of blocking probability as an object base station to which the association is transferred, such that the association of the relay node 2A with a currently associated base station is changed as being associated with the objective base station to which the association is transferred.

The information collector 201A, the information interactor 202A, the blocking probability calculator 205A, and the association controller 206A may be implemented by a processor such as CPU and the like to execute a specified program. The information collector 201A and the information interactor 202A are corresponding to the "information acquisition part", the blocking probability calculator 205A is corresponding to the "blocking probability calculation part", and the association controller 206A is corresponding to the "association control part".

The storage unit 204A stores various information needed for the blocking probability calculator 205A to calculate the blocking probabilities. Such information may be obtained via the information collector 201A or the information interactor 202A. The storage unit 204A may also be integrated with the information collector 201A or the information interactor 202A.

Specifically, the storage unit 204A stores a neighboring base station list 214, a related base station list 224, an associated base station list 234, relay channel information 244, relay load information 254, related cell base station channel information 264, related cell load information 274, related cell relay channel information 284, and related cell relay load information 294. The neighboring base station list 214 and the related base station list 224 are static information, and the associated base station list 234, the relay channel information 244, the relay load information 254, the related cell base station channel information 264, the related cell load information 274, the related cell relay channel information 284, and the related cell relay load information 294 are dynamic information.

The neighboring base station list 214 stores a list of base stations that can be associated with the relay node 2A. The related base station list 224 stores a list of base stations related to the relay node. The associated base station list 234 stores a list of base stations currently associated with the relay node. The neighboring base station list 214, the related base station list 224, and the associated base station list 234 may be stored in a unified storage format of a neighboring/related/associated base station recording table as illustrated in FIG. 7.

Figure 7:
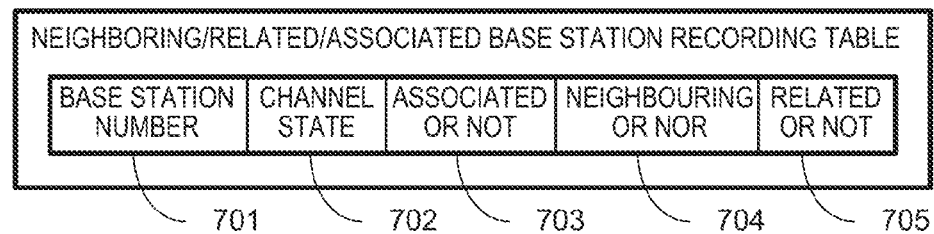
FIG. 7 is an explanatory diagram of a neighboring/related/associated base station recording table in the relay node according to the first embodiment of this invention.

FIG. 7 is an explanatory diagram of a neighboring/related/associated base station recording table in the relay node according to the first embodiment. The neighboring/related/associated base station recording table integrally illustrates the neighboring base station list 214, the related base station list 224, and the associated base station list 234. The table includes: a base station number 701, which indicates the number of a base station, and is an identifier for identifying the base station; a channel state 702, which indicates the state of a channel from the base station identified by the base station number 701 to the relay node 2A; associated or not 703, which indicates whether the relay node 2A is currently associated with the base station identified by the base station number 701; neighboring or not 704, which indicates whether the relay node 2A can be associated with the base station identified by the base station number 701; and related or not 705, which indicates whether the related base stations of the relay node 2A include the base station identified by the base station number 701.

As compared with the format illustrated in FIG. 4, in the format illustrated FIG. 7 the base station number 701 for identifying a base station is used to replace the relay number 401 in FIG. 4, and the relation between the relay node and the base station is recorded corresponding to the base station number 701.

The relay channel information 244 refers to information of a channel between a user belonging to the relay node and the relay node, and the relay load information 254 refers to information of the load of the user belonging to the relay node. The related cell base station channel information 264, the related cell load information 274, the related cell relay channel information 284, and the related cell relay load information 294 respectively refer to channel and load information of a user belonging to the base station, or channel and load information of a user belonging to the relay node. The specific format is the same as the format as illustrated in FIG. 5, and thus is omitted from detailed description.

In this embodiment, after the relay node 2A receives information advertised by the related base station, the blocking probability calculator 205A selects candidate base stations to be associated (neighboring base stations) according to the information collected by the information collector 201A and the information obtained by the information interactor 202A from the base station 1A, and respectively calculates a reduction of blocking probability when each of the candidate base stations to be associated performs association with the relay node 2A. The process of calculating a reduction of blocking probability is described in detail with reference to FIG. 10.

Figure 10:
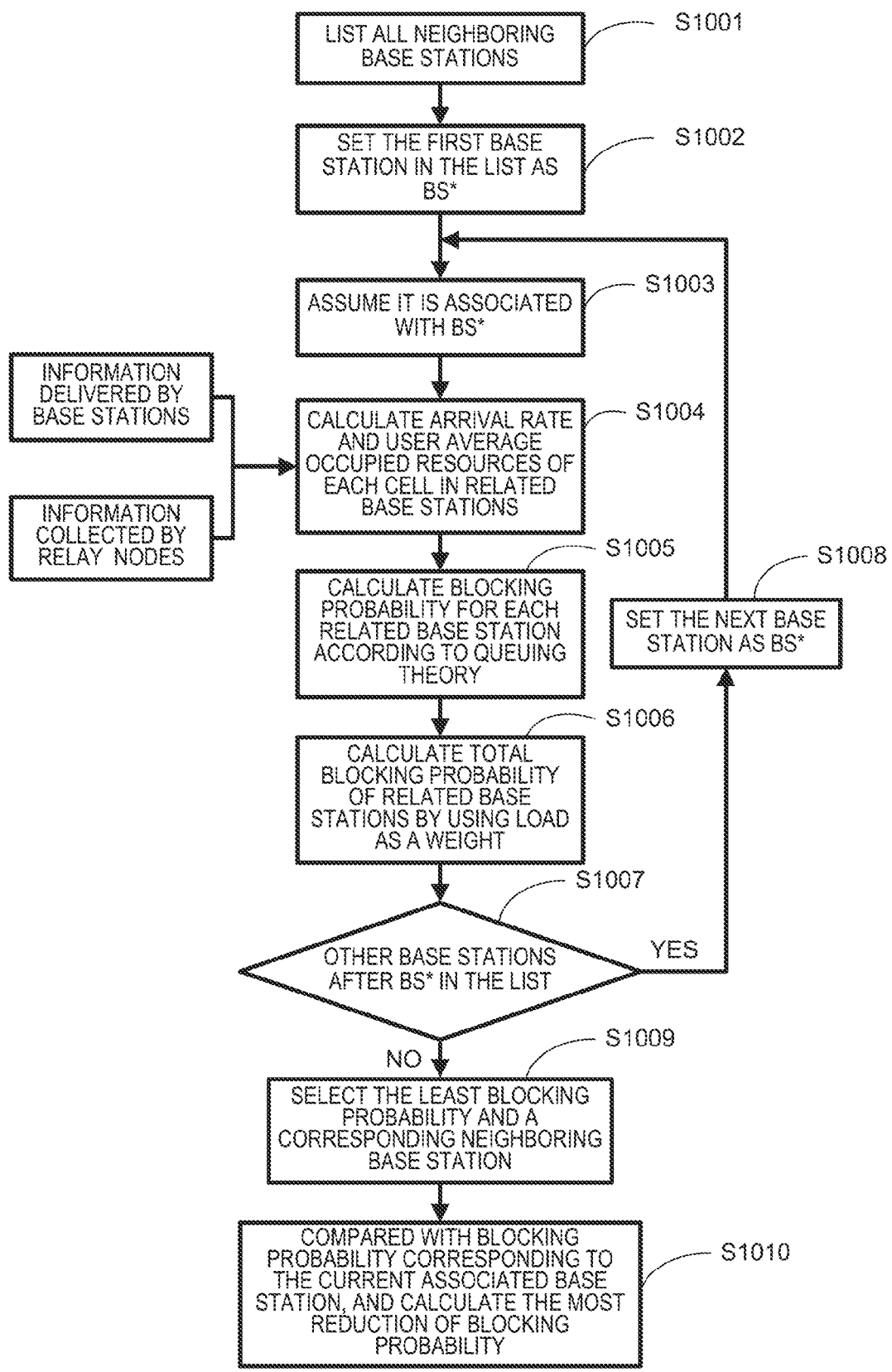
FIG. 10 is a flowchart illustrating processing of calculating a network blocking probability according to this invention.

FIG. 10 is a flowchart illustrating processing of calculating a network blocking probability by the blocking probability calculator 205A. As illustrated in FIG. 10, firstly, in step S1001 the blocking probability calculator 205A lists, with reference to the neighboring base station list 214, all the neighboring base stations as the candidate base stations to be associated, and sets the first base station in the list as BS* (step S1002). In addition, the range of the neighboring base station may be predefined.

Next, the blocking probability calculator 205A assumes that the relay node in which it is located is associated with the BS* (step S1003). Under such assumption, the blocking probability calculator 205A calculates arrival rate and user average occupied resources (step S1004) of each cell in the ACC (related base station), according to the information stored in the storage unit 204A that is delivered by the base station and delivered by the relay node (e.g., the relay channel information 244, the relay load information 254, the related cell base station channel information 264, the related cell load information 274, the related cell relay channel information 284, and the related cell relay load information 294).

Next, based on the calculation result of step S1004, the blocking probability of each of the related base stations is calculated according to queuing theory (step S1005), so as to calculate the total blocking probability (step S1006), to obtain the candidate blocking probabilities when the relay node performs association with the BS*. The total blocking probability is a weighted sum of the blocking probabilities of the related base stations by using the load of each of the base stations as a weight, and may be calculated with reference to the prior art and thus is omitted from detailed description.

Next, the blocking probability calculator 205A determines whether the list includes other base stations that are not processed (step S1007). Proceed to step S1008 in a case where the determination is "Yes", and the next base station that is not processed is set as BS*, so as to start from step S1003 repetitive calculation of the blocking probability for the next base station that is not processed. Proceed to step S1009 in a case where the determination is "No", and the least blocking probability is selected from the candidate blocking probabilities and a related base station corresponding to this blocking probability is selected.

Finally, the selected least candidate blocking probability is compared with the current blocking probability corresponding to the current base station that is actually associated, to calculate the most reduction of blocking probability (step S1010).

During the calculation of blocking probability as illustrated in FIG. 10, both the calculation of the arrival rate and the user average occupied resources, and the method of queuing theory may make reference to the specific calculation methods in the prior art, which are thus omitted from detailed description. Nevertheless, this invention is not limited to the calculation method based on queuing theory. Any method that can be used to calculate blocking probability may be used in implementation of this invention. The type and content of the information stored in the storage unit may vary accordingly depending on different calculation methods for blocking probability.

In addition, in step S1009, the difference between each of the blocking probabilities and the current blocking probability may be respectively calculated, and then the most reduction of blocking probability is selected therefrom.

As such, based on the processing by the blocking probability calculator 205A as illustrated in FIG. 10, the relay node 2A selects, according to the calculated most reduction of blocking probability, a neighboring base station corresponding to the most reduction of blocking probability as a destination base station to which the association is transferred.

In addition, as described above, the base station 1A may receive the reductions of blocking probability calculated by the related relay nodes from the related relay nodes (which can establish association with the base station 1A), and select a relay node therefrom which permits transfer of the association.

Figure 12:
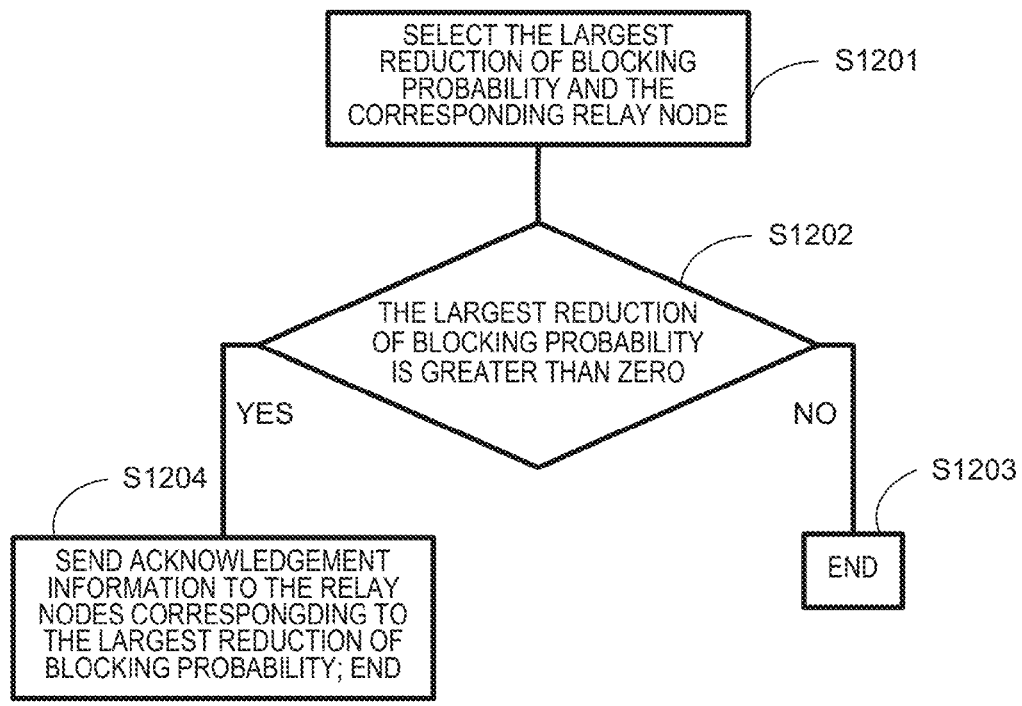
FIG. 12 is a flowchart of relay node selection processing performed by the base station according to the first embodiment of this invention.

FIG. 12 is a flowchart of relay node selection processing performed by the base station according to the first embodiment.

As illustrated in FIG. 12, firstly the relay selector 103A selects, according to the related relay channel information 164 and the related relay load information 174, the largest one from the received most reductions of block probability and a relay node corresponding to it (step S1201).

Next, it is determined whether the largest one of the most reductions of blocking probability is greater than zero (step S1202). In a case where the determination is "No", it indicates that even if the currently associated base station of the relay node sending the largest reduction of blocking probability is changed, the blocking probability may not be optimized. Therefore, no association transfer is performed for the relay node and the process ends (step S1203).

Proceed to step S1204 in a case where the determination is "Yes", and acknowledgement is sent as acknowledgement information to the relay node corresponding to the largest reduction of blocking probability.

In conjunction with an interaction relation between the base station and the relay node in the wireless communication system, it can be known that the specific process of the solution for dynamically associating the relay node and the base station in the wireless communication system according to the first embodiment includes the following steps:

(1) Information collection: Each base station and relay node collect statistics for channel information and load information of users via an information collector, and store the collected information into their own storage units.

(2) Information spreading: Each relay node sends the channel information and load information collected in the first step to its own associated base station via an information interactor. The base station gathers the channel information and load information thereof, and channel information and load information sent by an associated relay node, and then sends the gathered information to its own related relay nodes via the information interactor.

(3) Calculation of blocking probability: Upon receiving the information advertised by the related base station, the relay node calculates a blocking probability of a related base station when the relay node respectively performs association with each of the different neighboring base stations, selects the least blocking probability from the calculated blocking probabilities, and compares with the current blocking probability to obtain the most reduction of blocking probability. The calculation of blocking probability is performed by the blocking calculator according to the process as illustrated in FIG. 10.

(4) Blocking probability reporting and relay node selecting: Each relay node reports the most reduction of blocking probability to all the related base stations thereof. Upon receiving the reductions of blocking probability from the related relay nodes, the base station selects, by using the relay selector, a relay node having the largest reduction of blocking probability according to the process as illustrated in FIG. 12, and replies the relay node with acknowledgement information.

(5) Change of association: When a relay node receives acknowledgement information from all the related base stations, it indicates that the association transfer is permitted by all the related base stations. Therefore, the relay node changes the association relation with the base station to achieve the most reduction of blocking probability.

Figure 14:
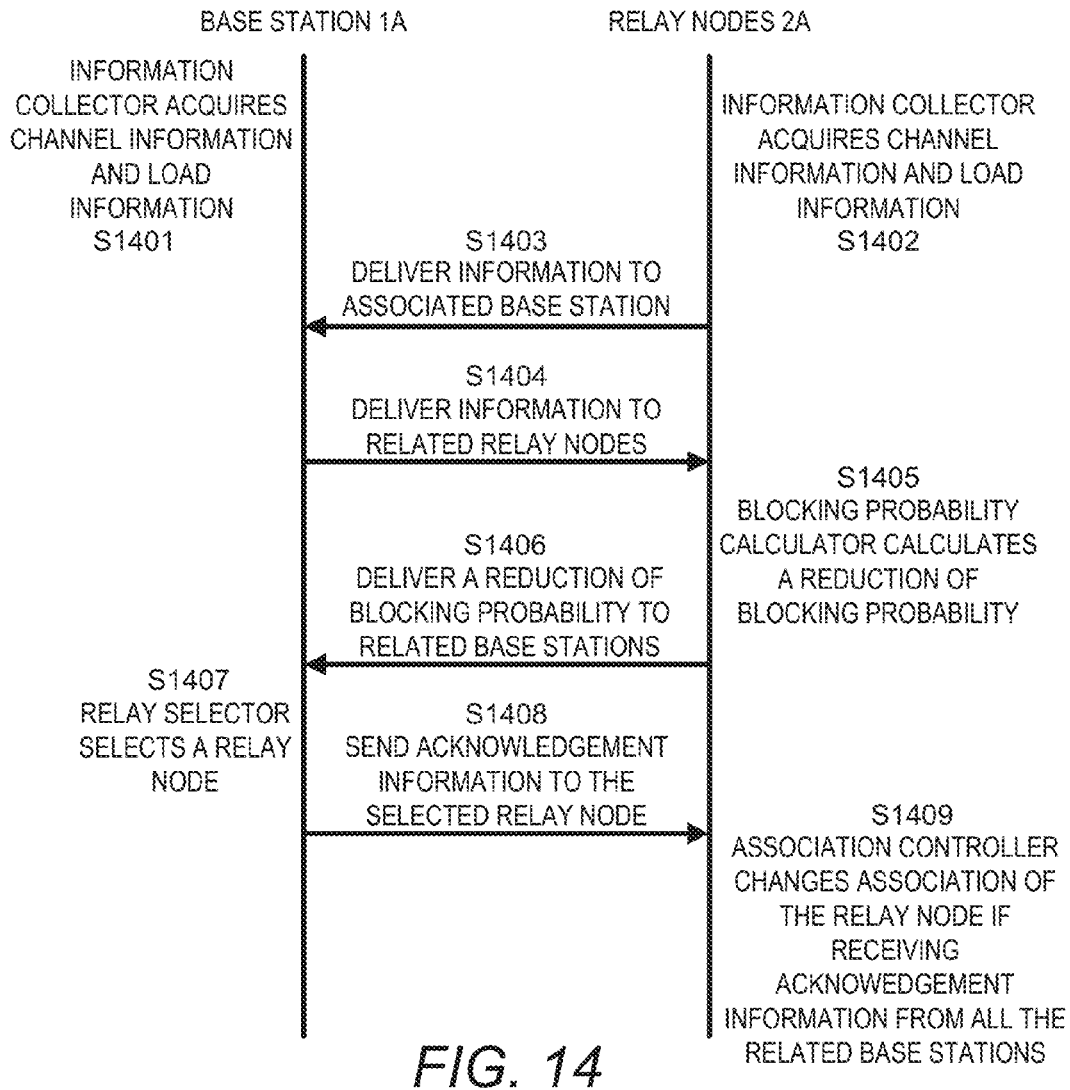
FIG. 14 is a flowchart of process of information interaction of base station-relay node in the wireless communication system according to the first embodiment of this invention.

Based on the above specific process of the solution for dynamically associating the relay node and the base station, an information interaction process is formed as illustrated in FIG. 14 using the scenario in the wireless communication system where there is a base station 1A and a relay node 2A that is currently associated with the base station 1A as an example.

FIG. 14 is a flowchart of process of information interaction of base station-relay node in the wireless communication system according to the first embodiment. As illustrated in FIG. 14, firstly the information collector 101A of the base station 1A and the information collector 201A of the relay node 2A respectively acquire channel information and load information (step S1401, step 1402), and the information interactor 202A of the relay node 2A sends the acquired information as report information to the currently associated base station (step S1403). The format of the report information is as illustrated in FIG. 8.

Figure 8:
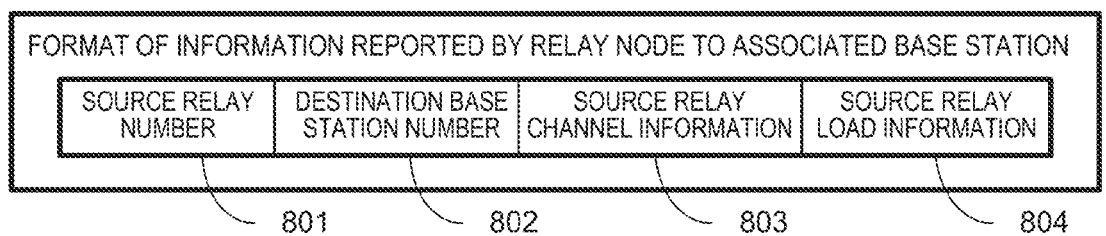
FIG. 8 is an explanatory diagram of a format of information reported by the relay node to an associated base station according to the first embodiment of this invention.

FIG. 8 is an explanatory diagram of a format of information reported by the relay node to an associated base station according to the first embodiment. The information reported by the relay node to the associated base station includes: a source relay number 801, which indicates the number of a relay node sending the report information, such that the base station identifies the relay node; a destination base station number 802, which indicates the number of a base station receiving the report information; source relay channel information 803, which indicates the channel information of the relay node sending the report information; and source relay load information 804, which indicates load information of the relay node sending the report information.

The base station 1A which receives the report information from the relay node 2A also sends its acquired information to the related relay nodes, such that the relay node 2A calculates the blocking probability (step S1404). The format of the advertisement information delivered by the base station 1A to the relay node 2A is as illustrated in FIG. 9.

Figure 9:
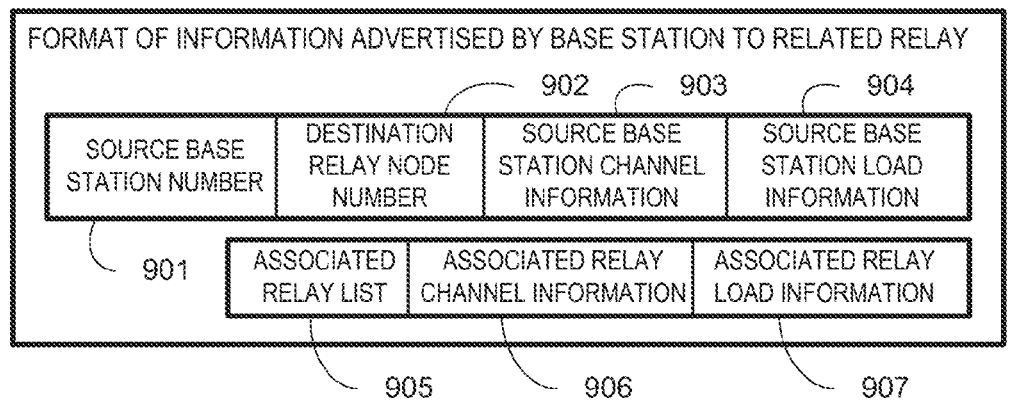
FIG. 9 is an explanatory diagram of a format of information advertised by the base station to a related relay node according to the first embodiment of this invention.

FIG. 9 is an explanatory diagram of a format of information advertised by the base station to a related relay node according to the first embodiment. The advertisement information delivered by the base station 1A to the relay node 2A includes: a source base station number 901, which indicates the number of a base station sending the advertisement information, such that the relay node identifies the base station; a destination relay node number 902, which indicates the number of a relay node receiving the advertisement information; source base station channel information 903, which indicates the channel information of the base station sending the advertisement information; source base station load information 904, which indicates the load information of the base station sending the advertisement information; an associated relay list 905, which is the same as the associated relay list 134 stored in the storage unit 104A, and indicates a list of relay nodes that are currently associated with the base station sending the advertisement information; associated relay channel information 906, which indicates the channel information of the relay node that is currently associated with the base station sending the advertisement information; and associated relay load information 907, which indicates the load information of the relay node that is currently associated with the base station sending the advertisement information.

Upon receiving the advertisement information from the base station 1A, the relay node 2A calculates, by using the content in the advertisement information and the channel information and load information of the related cell base stations and relay nodes stored in the storage unit 204A, a reduction of blocking probability (step S1405) according to the process as illustrated in FIG. 10, and delivers the calculated reduction of blocking probability to all the related base stations (here, the base station 1A does not act as an associated base station, but acts as a related base station for receiving the reduction of blocking probability) (step S1406). The format of information of a reduction of blocking probability reported by the relay node to the related base station is as illustrated in FIG. 11.

Figure 11:
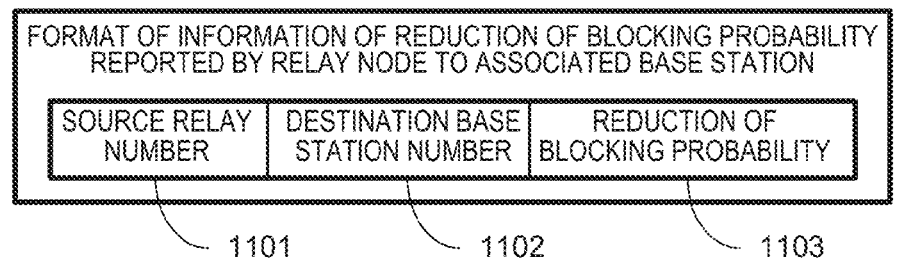
FIG. 11 is an explanatory diagram of a format of information of a reduction of blocking probability reported by the relay node to a related base station according to the first embodiment of this invention.

FIG. 11 is an explanatory diagram of a format of information of a reduction of blocking probability reported by the relay node to a related base station according to the first embodiment. The report information of the reduction of blocking probability includes: a source relay number 1101, which indicates the number of a relay node sending the report information of the reduction of blocking probability; a destination base station number 1102, which indicates the number of a base station receiving the report information of the reduction of blocking probability; a reduction of blocking probability 1103, which indicates the most reduction of blocking probability when the relay node sending the report information of the reduction of blocking probability changes the association relation.

The relay selector of the base station 1A respectively receives report information of the most reduction of blocking probability from each of the related relay nodes, selects, by comparison, a relay node corresponding to the largest one of the most reductions of blocking probability among a plurality of relay nodes as a relay node which permits association transfer (step S1407), and sends acknowledgement information to the corresponding relay node (step S1408).

In addition, the portion of the reduction of blocking probability 1103 in the report information as illustrated in FIG. 11 may not be the most reduction of blocking probability, but may be other data indicating details of the blocking probability. For example, the blocking probability is directly delivered, and the relay selector selects a relay node having the least predicted blocking probability and sends acknowledgement information to the relay node.

Figure 13:
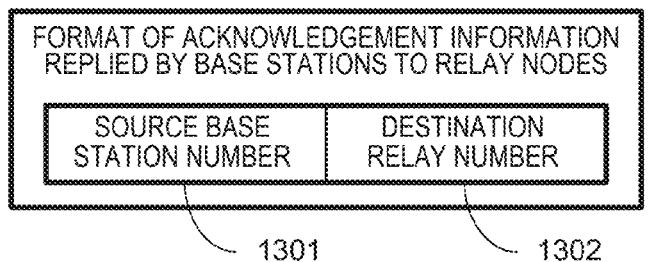
FIG. 13 is an explanatory diagram of an example of a format of acknowledgement information replied by the base station to a selected relay node according to the first embodiment of this invention.

FIG. 13 is an explanatory diagram of an example of a format of acknowledgement information replied by the base station to a selected relay node according to the first embodiment. As illustrated in FIG. 13, the acknowledgement information replied by the base station as a transfer instruction to a relay node, for example, includes: a source base station number 1301, which indicates the number of a base station sending acknowledgement information; and a destination relay number 1302, which indicates the number of a relay node receiving the acknowledgement information.

The format of the acknowledgement information is not fixed, and any message in any format and with any content may be applicable as long as it can convey that the base station confirms that the relay node is permitted to perform association transfer.

In this way, in a case where acknowledgement information is received from all the related base stations, the association controller of the relay node 2A receiving the acknowledgement information performs changing of the base station with which the present relay node is associated by establishing a communication and association relation with an object base station to which the association is transferred, and interrupting information interaction with the currently associated base station (step S1409).

As known from the above description, by changing the associated base station of a relay node, the current structure of a wireless network is changed to such a structure that can reduce blocking probability the most, thereby the communication resources of the system are more effectively utilized, and the blocking probability during the service process is further reduced.

The above FIG. 14 illustrates the process of an information interaction according to the first embodiment. However, this invention is not limited to such process, and the specific implementation process may be subjected to various modifications, as long as it conforms to the solution which dynamically changes the association between the relay node and the base station in the wireless communication system.

For example, in this embodiment, the relay node calculates the most reduction of blocking probability and sends it to the base station, and the base station selects a relay node according to the most reduction of blocking probability. But alternatively, the blocking probability calculator of the relay node may only calculate each of the candidate blocking probabilities and send it to the base station, the base station may select, according to the candidate blocking probabilities, a base station corresponding to a certain candidate blocking probability as an object base station to which the association is transferred. For example, a base station having the least candidate blocking probability may be selected as the object base station to which the association is transferred.

By directly selecting the blocking probability, the amount of calculation and the time required for the calculation can be reduced, and the blocking probability of a specific cell or relay node can be reduced to the least.

Other Modified Embodiment

In the first embodiment, as illustrated in FIG. 12, when the relay node sends the most reduction of blocking probability to all the related base stations, each of the base stations may select the largest one from the received reductions of blocking probability, and reply the corresponding relay node with acknowledgement information.

However, in the practical system, since certain errors exist in collection of the information, the calculation of blocking probability is somewhat deviated from the practical blocking probability. Therefore, specifically in a case where the reduction of blocking probability is relatively small, such deviation may result in a decision that the association between the base station and the relay node is mistakenly changed in the original solution. On the other hand, the changing of the association between the relay node and the base station also needs to pay a certain cost, including a switching delay or the like. In a case where the decision of changing the association is made when the reduction of blocking probability is very small, it may result in excessively frequent changing of the association between the relay node and the base station, and thus may bring heavy burden to the system.

Therefore, as a modified embodiment, when the base station in the first embodiment performs relay node selection, assume that a threshold is set for the reduction of blocking probability, only when the selected reduction of blocking probability exceeds the threshold, the base station sends acknowledgement information to the relay node corresponding to this reduction of blocking probability, otherwise the base station does not send the acknowledgement information.

In this modified embodiment, components and structures of the base station and the relay node in the wireless communication system are the same as those in the first embodiment. The only difference lies in that the actions of the relay selector are different. Therefore, no detailed description is given with respect to the same parts.

Figure 15:
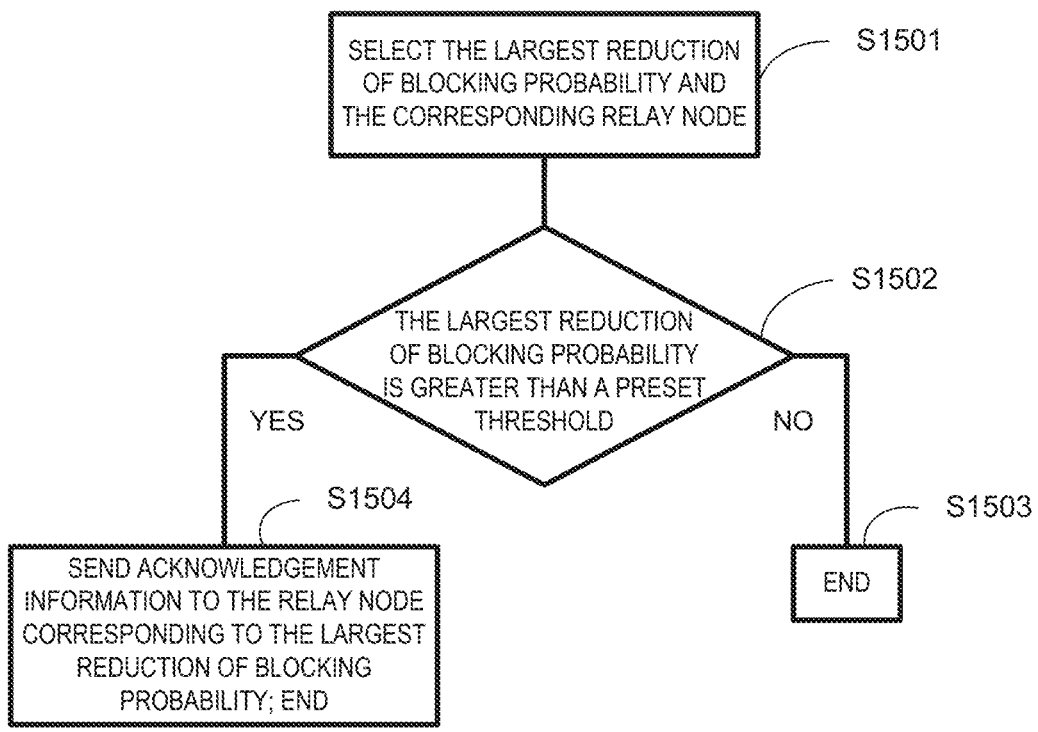
FIG. 15 is a flowchart of a modified embodiment of the relay node selection processing performed by the base station according to the first embodiment of this invention.

Specifically, the relay selector in the base station acknowledges the relay node according to the process as illustrated in FIG. 15.

FIG. 15 is a flowchart of a modified embodiment of the relay node selection processing performed by the base station according to the first embodiment. As illustrated in FIG. 15, firstly the relay selector 103A selects, according to the related relay channel information 164 and the related relay load information 174, the largest one from the received most reductions of blocking probability and a corresponding relay node (step S1501).

Next, it is determined whether the largest reduction of blocking probability is greater than a preset threshold (step S1502). In a case where the determination is "No", it indicates that even if the currently associated base station of the relay node sending the largest reduction of blocking probability is changed, the blocking probability may not be optimized. Therefore, no association transfer is performed for the relay node and the process ends (step S1503).

Proceed to step S1504 in a case where the determination is "Yes", and acknowledgement information is sent to the relay node corresponding to the largest reduction of blocking probability, and then the process ends. According to this modified embodiment, the same technical effects as in the first embodiment can also be achieved.

In addition, by setting the threshold for the reduction of blocking probability, the mistaken decision of changing the association between the base station and the relay node can be prevented, and the heavy burden brought to the system due to excessively frequent changing of the association between the relay node and the base station can also be prevented.

Furthermore, various variations and modifications of the preferred solutions made in the first embodiment are also applicable to this modified embodiment.

Second Embodiment

The first embodiment is characterized in that calculating the blocking probability and determining a relay node which performs association transfer or a base station to which the association is transferred is done in a relay node.

However, in the practical system, as compared with the base station, the processing and calculation capabilities of the relay node are limited. Therefore, calculating the blocking probability in the relay node may bring heavy burden to the relay node, and it needs to consider transferring the calculation of the blocking probability to the associated base station of the relay node.

The second embodiment is carried out based on the above consideration, and as compared with the technical solution of the first embodiment, the difference lies in that the base station has a part capable of calculating the blocking probability. For this modification, information related to the blocking probability and originally stored in the relay node needs to be stored in the storage unit of the base station. Said information includes: a list of related base stations of the relay node, and channel information and load information of the base stations and relays in the related cells. The relay node needs to deliver the information collected by itself and the information delivered by the related base stations to the associated base station. The associated base station calculates the blocking probability of each of the associated relays, and then delivers the calculation result to the corresponding relay node for determining an object base station to which the association is transferred.

In addition to the above difference, in the second embodiment, the other parts are the same as those in the first embodiment. Like components are represented by like reference numbers, and are thus omitted from detailed description.

Figure 16:
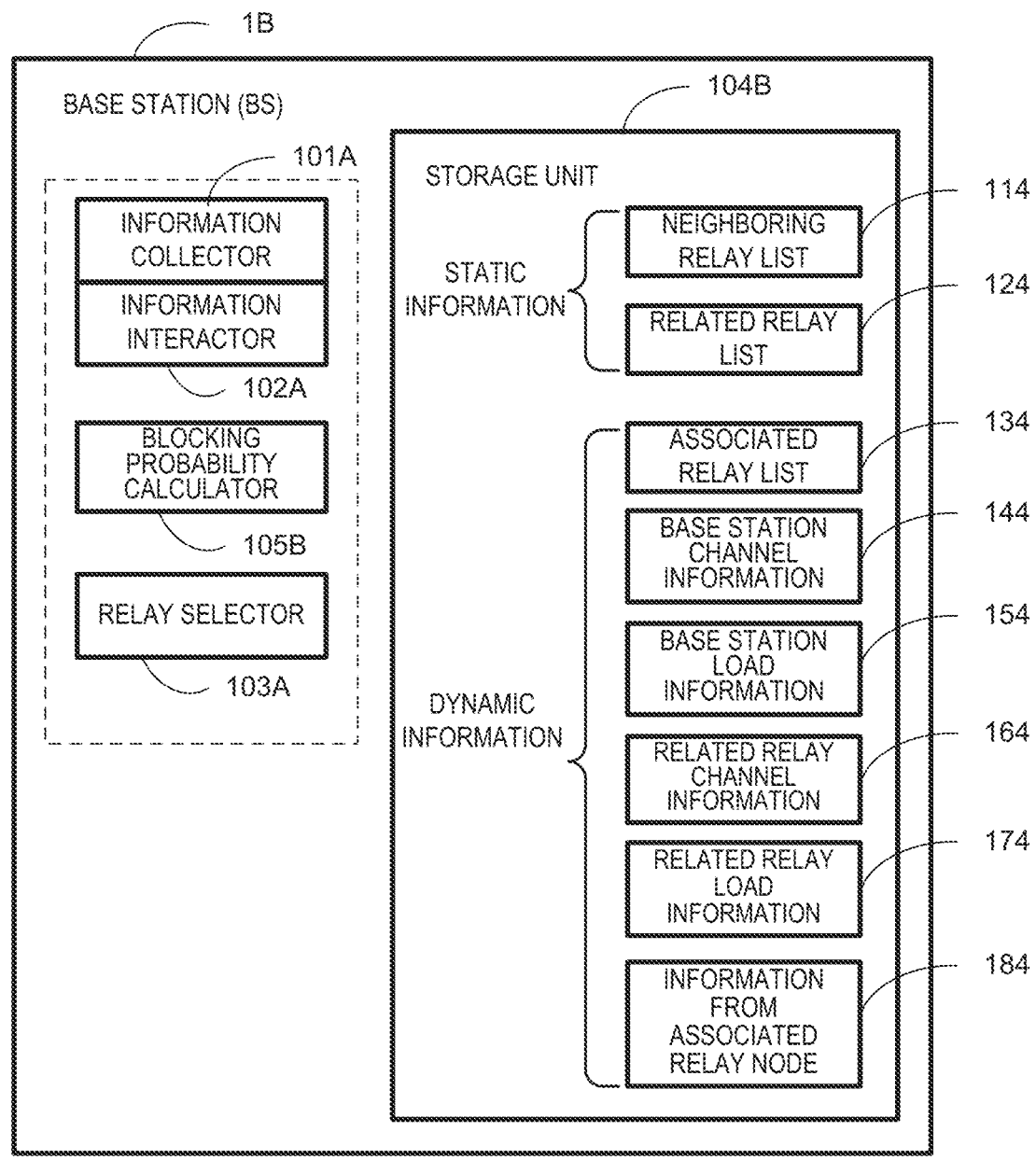
FIG. 16 is a block diagram of an internal structure of a base station in a wireless communication system according to a second embodiment of this invention.

FIG. 16 is a block diagram of an internal structure of a base station 1B in a wireless communication system according to the second embodiment. Different from the base station 1A in the first embodiment, the storage unit additionally stores information related to the calculation of blocking probability, which specifically includes: a list of related base stations of each associated relay, and load information and channel information of the base stations and relays in its related cells. In addition, a blocking probability calculator is added for calculating the most reduction of blocking probability of each of the associated relay nodes.

Specifically, the base station 1B includes an information collector 101A, an information interactor 102A, a blocking probability calculator 105B, a relay selector 103A, and a storage unit 104B.

The information collector 101A is configured to collect channel information and load information of the base station 1B, and store the information into the storage unit 104B. The information interactor 102A is configured to interact information with the related relay nodes to deliver an information message and an instruction message.

The blocking probability calculator 105B selects, with respect to an object relay node associated with the base station 1B, candidate base stations to be associated (neighboring base station) from base stations except the present base station, respectively calculates, according to information from the relay node and the acquired information, a candidate reduction of blocking probability when the object relay node performs association with each of the candidate base stations, and sends a calculation result to the object relay node via the information interactor 102A.

The relay selector 103A is an optional component, and is mainly used for a larger-scale wireless communication network. Specifically, since there is a plurality of base stations and a plurality of relay nodes in the network, the impact on blocking probability of a certain base station has an issue of destructive superimposition when a plurality of relay nodes all change their associations. Therefore, the relay selector 103A is arranged in the base station, and the relay selector 103A receives data indicating a change of blocking probability, for example, the most reduction of blocking probability, from the related relay nodes, so as to select a relay node permitting transfer of the association from the data indicating the change of blocking probability, and send acknowledgement information to the selected relay node.

The information collector 101A, the information interactor 102A, the blocking probability calculator 105B, and the relay selector 103A may be implemented by a processor such as CPU or the like to execute a specified program.

The storage unit 104B stores various information needed for the blocking probability calculator 105B and the relay selector 103A to perform the processing. Such information may be obtained via the information collector 101A or the information interactor 102A. The storage unit 104B may also be integrated with the information collector 101A or the information interactor 102A.

Specifically, the storage unit 104B stores: a neighboring relay list 114, a related relay list 124, an associated relay list 134, base station channel information 144, base station load information 154, related relay channel information 164, related relay load information 174, and information from associated relay node 184. The information from associated relay node 184 corresponds to the information stored in the storage unit 204A in the relay node 2B and related to the calculation of blocking probability, and is all the information collected by the associated relay node, including channel information and load information of the related base stations collected from the related base stations of the relay node. The information from the associated relay node may be obtained by periodically reporting by the relay node to the associated base station.

Figure 17:
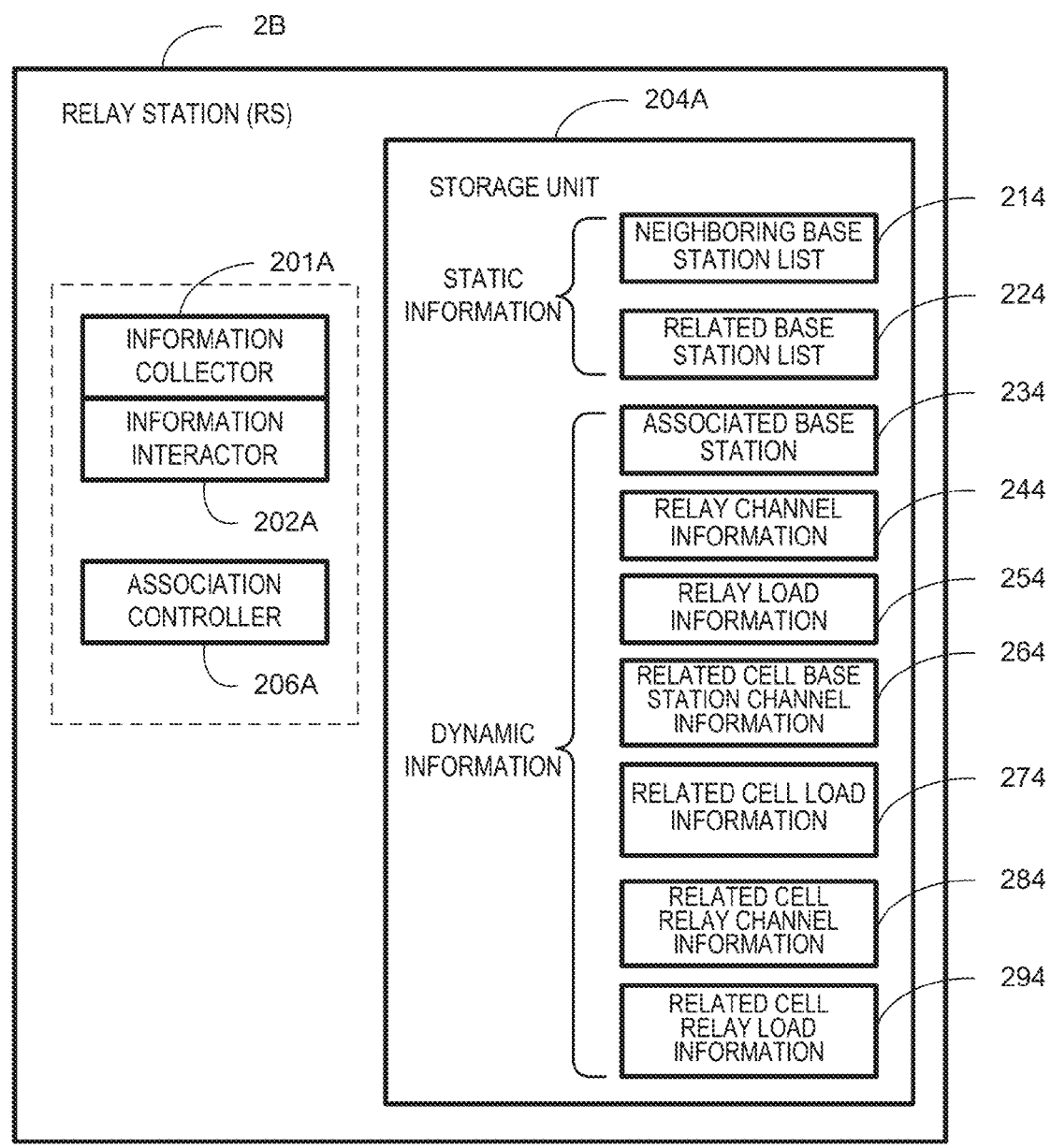
FIG. 17 is a block diagram of an internal structure of a relay node in the wireless communication system according to a second embodiment of this invention.

FIG. 17 is a block diagram of an internal structure of a relay node 2B in the wireless communication system according to the second embodiment. Different from the relay node 2A in the first embodiment, the relay node 2B does not have the blocking probability calculator.

Specifically, the relay node 2B includes an information collector 201A, an information interactor 202A, an association controller 206A, and a storage unit 204A.

The association controller 206A selects an object base station to which the association is transferred according to the information received from the base station 1B indicating the blocking probability via the information interactor 202A.

Specifically, the storage unit 204A stores: a neighboring base station list 214, a related base station list 224, an associated base station list 234, relay channel information 244, relay load information 254, related cell base station channel information 264, related cell load information 274, related cell relay channel information 284, and related cell relay load information 294.

Figure 18:
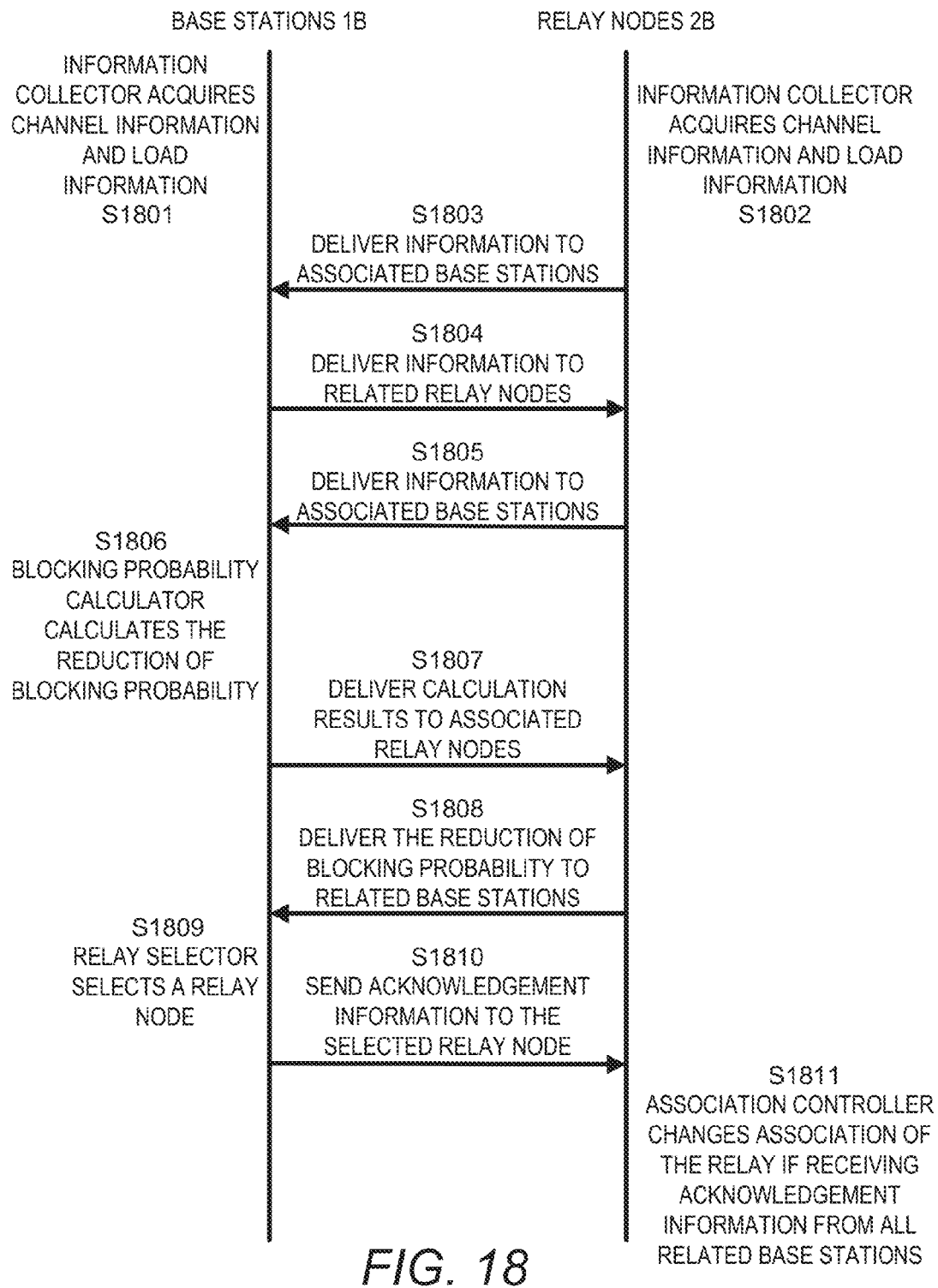
FIG. 18 is a flowchart of process of information interaction of base station-relay node in the wireless communication system according to the second embodiment of this invention.

Process of information interaction of base station-relay node in the solution for dynamically associating the relay node and the base station in the wireless communication system according to the second embodiment is as illustrated in FIG. 18.

FIG. 18 is a flowchart of process of information interaction of base station-relay node in the wireless communication system according to the second embodiment. As illustrated in FIG. 18, firstly the information collector 101A of the base station 1B and the information collector 201A of the relay node 2B respectively acquire channel information and load information (step S1801, step 1802), and the information interactor 202A of the relay node 2B sends the acquired information as report information to the currently associated base station (step S1803). The format of the report information is as illustrated in FIG. 8.

The base station 1B which receives the report from the relay node 2B also sends its acquired information to the related relay nodes (step S1804). Such information interaction is a general information interaction between the base station and the associated relay node. The information may be delivered in any format.

In addition, the relay node 2B further delivers information needed for calculation of blocking probability (step S1805). Said information includes: a list of related base stations of the relay node, and channel information and load information of the base stations and relays in the related cells.

The base station 1B receiving the needed information calculates, according to the process as illustrated in FIG. 10 or the like, the reduction of blocking probability (step S1806), and delivers the calculation result (i.e., the reduction of blocking probability and the corresponding base station) to the associated relay node 2B acting as a calculation object (step S1807). The relay node 2B selects the most reduction of blocking probability from the calculation result, and uses a base station corresponding to the most reduction of blocking probability as a destination base station to which the association is transferred.

Next, to get permission of the related base stations, the relay node 2B delivers the reduction of blocking probability to all the related base stations (step S1808).

The base station 1B acts as a related base station, and its relay selector selects the largest one from the received most reductions of blocking probability of the related relay nodes, and uses the relay node sending the selected largest reduction of blocking probability as a selected relay node, and sends acknowledgement information to the relay node (step S1810).

In this way, in a case where acknowledgement information is received from all the related base stations, the association controller of the relay node 2B receiving the acknowledgement information performs changing of the base station with which the relay node is associated by establishing a communication and association relation with an object base station to which the association is transferred, and interrupting information interaction with the currently associated base station (step S1811).

In the second embodiment, the base station sends the calculated virtual blocking probabilities when the object relay node performs association with its neighboring base stations to the object relay node, and the object relay node selects the virtual blocking probability corresponding to the base station acting as the destination base station to which the association is transferred. However, the base station may also directly selects the most reduction of blocking probability from the virtual blocking probabilities, and sends only the most reduction of blocking probability and the corresponding base station to the object relay node.

In addition, in the second embodiment, for a wireless communication system having a small number of cells or imposing lower requirements on the association transfer efficiency, steps S1808 to S1811 may be omitted.

According to the second embodiment, the same technical effects as in the first embodiment can also be achieved.

In addition, since the function of calculating blocking probability is configured in the base station in the second embodiment, the processing burden of the relay node may be reduced, and the blocking probability is calculated by the base station having a powerful processing capability, thereby improving the load transfer efficiency of the entire wireless communication system.

Furthermore, various variations and modifications of the preferred solutions made in the first embodiment are also applicable to the second embodiment.

In addition, the modified embodiment of the first embodiment is also applicable to the second embodiment. That is, in the second embodiment, the relay selector in the base station may also determine whether to transfer the association using a preset threshold.

Third Embodiment

In the first embodiment and the second embodiment, simulation blocking probabilities in a case where the relay nodes perform association with the related base stations are calculated in the relay nodes or the base stations respectively, such that the relay selector arranged in the base station determines which base station is to be associated with the relay node according to the calculated simulation blocking probabilities.

This is equivalent to the scenario where the components for dynamic association control are distributed in the base stations and the relay nodes to collaboratively perform management of dynamic association control. However, this invention is not limited to the above embodiments. Nevertheless, the relay node may determine by itself which base station the relay node is to be associated with.

In addition, in a third embodiment, an integrated dynamic association control apparatus capable of interacting information with each relay node and base station may be additionally arranged in the wireless communication system. Changing of the dynamic association of the relay nodes in the wireless communication network is controlled by the dedicated dynamic association control apparatus.

Figure 19:
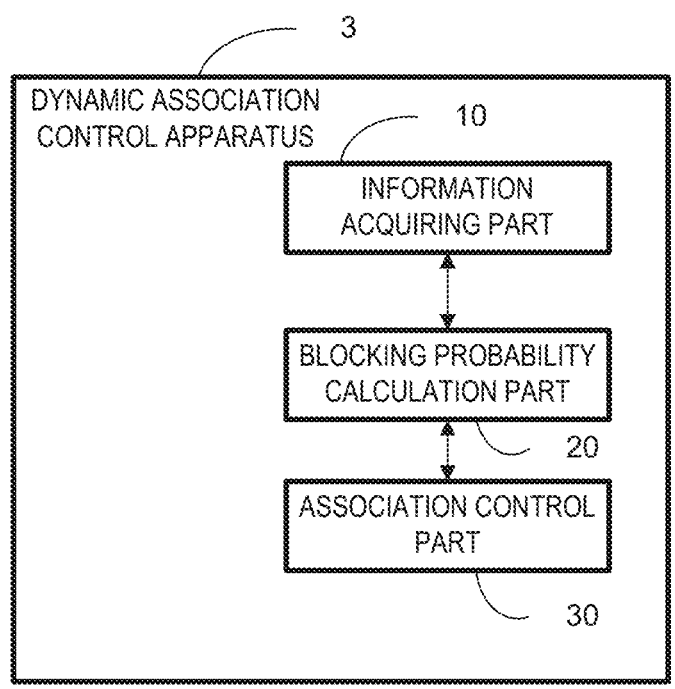
FIG. 19 is a structural block diagram of a dynamic association control apparatus according to a third embodiment of this invention.

FIG. 19 is a structural block diagram of a dynamic association control apparatus 3 according to the third embodiment. As illustrated in FIG. 19, the dynamic association control apparatus 3 includes: an information acquisition part 10, a blocking probability calculation part 20, and an association control part 30.

The information acquisition part 10 acquires, by receiving/sending information from/to a base station and a relay node, information related to an object relay node and to candidate base stations to be associated. The so-called candidate base station to be associated refers to a base station that is related to the relay node and capable of performing relation with the relay node. In addition, the information acquisition part 10 may also select several base stations from the base stations that are related to the relay node and capable of performing relation with the relay node as the candidate base stations, thereby reducing the amount of calculation. Alternatively, the information acquisition part 10 selects base stations of several related cells as the candidate base stations according to the distance of the related cells. Furthermore, the information acquisition part 10 may also collect information of each base station and relay node in the network via other devices such as a server or the like.

The blocking probability calculating part 20 respectively calculates, according to the information acquired by the information acquisition part 10, a blocking probability in a case where an object relay node is associated with each of the candidate base stations to be associated. Such calculation of the blocking probability is a dynamic simulation calculation to analyze the impacts on the network blocking probability when the association is changed. The specific calculation method is the same as the calculation method employed by the blocking probability calculator in the first embodiment.

The association control part 30 selects an object blocking probability from the calculated candidate blocking probabilities, uses a base station corresponding to the object blocking probability as an object base station to which the association is transferred, and sends the result to a corresponding object relay node, so that the object relay node changes to be associated with the object base station to which the association is transferred.

The detailed steps of the dynamic management are described hereinafter.

Figure 20:
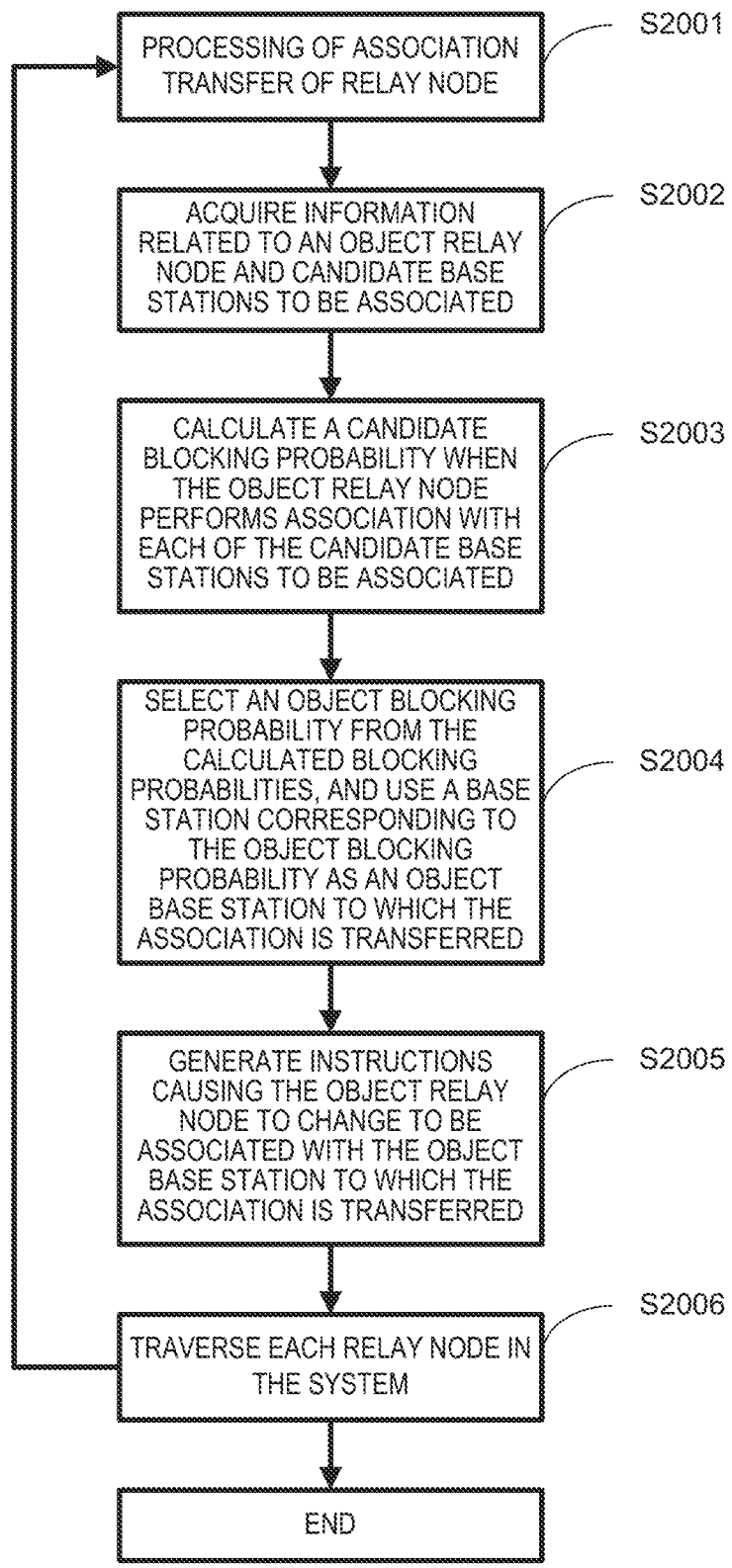
FIG. 20 is a flowchart of dynamic association management performed by the dynamic association control apparatus according to the third embodiment of this invention.

FIG. 20 is a flowchart of dynamic association management performed by the dynamic association control apparatus according to the third embodiment. In step S2001, processing of association transfer of the relay node is started.

Firstly, the information acquisition part 10 selects a relay node in the wireless communication system as an object relay node, uses base stations except the currently associated base station that are related to and can perform association with the object relay node as candidate base stations to be associated, and acquires information related to the object relay node and to the candidate base stations to be associated (step S2002).

Next, the blocking probability calculation part 20 calculates, according to the acquired information, a blocking probability when the object relay node is associated with each of the candidate base stations to be associated (step S2003).

The association control part 30 selects the least blocking probability from the calculated candidate blocking probabilities as an object blocking probability, or compares each of the candidate blocking probabilities with the current blocking probability and selects a blocking probability having the most reduction of blocking probability as an object blocking probability, uses a base station corresponding to the object blocking probability as an object base station to which the association of the object relay node is transferred (step S2004), and generates, according to the selection result, instructions causing the object relay node to change to be associated with the object base station to which the association is transferred, and sends the instructions to the relay node, the currently associated base station, and the object base station to which the association is transferred, such that the object relay node transfers the association (step S2005).

Finally, the next relay node is used as a new object relay node, and the same processing is repeated until all the relay nodes in the system are traversed (step S2006).

The dynamic association control apparatus 3 may periodically perform the above dynamic association management to optimize partition of a cell.

In addition, when selecting the object blocking probability from the candidate blocking probabilities, the association control part may also determine whether a reduction of the selected object blocking probability as compared with the current blocking probability is greater than a preset threshold, and cause the object relay node to change to be associated with the object base station to which the association is transferred only when the reduction is greater than the preset threshold.

Furthermore, the association control part may also not consider the reduction of the blocking probability, but use a candidate blocking probability which is the least and is lower than a defined threshold as the object blocking probability.

The above-described dynamic association control apparatus may be arranged independently of the base station and the relay node, or may be installed in the base station or the relay node, and additionally, the function modules of the dynamic association apparatus may be split into different base stations and relay nodes, and may share the data or information stored in the storage units of the base station and the relay node in a structure in conjunction with the base station and the relay node.

For example, the information acquisition part may be installed in a base station or a relay node in a wireless communication comprising base stations and relay nodes, the blocking probability calculation part may be installed in a base station, and the association control party may be installed in the relay node.

In addition, although not illustrated in the figure, the association control apparatus may also include a relay selection part. In a case where there is a plurality of the object relay nodes, the relay selection part chooses the smallest selected object blocking probability from selected object blocking probabilities of a plurality of object relay nodes, and only cause an object relay node corresponding to the chosen selected object blocking probability to perform association transfer.

Alternatively, in a case of using the most reduction of blocking probability to determine a destination base station to which the association is transferred, the relay selection part may also select the largest one from the most reductions of blocking probability of a plurality of object relay nodes, and only cause the object relay node corresponding to the selected most reduction of blocking probability to perform association transfer.

According to the third embodiment, the same technical effects as in the first embodiment can also be achieved.

In addition, since the dynamic association control apparatus for load transfer is independently arranged as compared with the first embodiment or the second embodiment, the processing burden of the relay node and the base station is further reduced, i.e., the overall load of the entire network of the wireless communication system can be managed by one apparatus, and a plurality of dynamic association control apparatuses may be arranged or incorporated into the base station and the relay node, such that the structure of the wireless communication system is more flexible.

Specific Embodiment

For ease of understanding, the invention is described hereinafter by way of example with reference to a specific embodiment.

Figure 21:
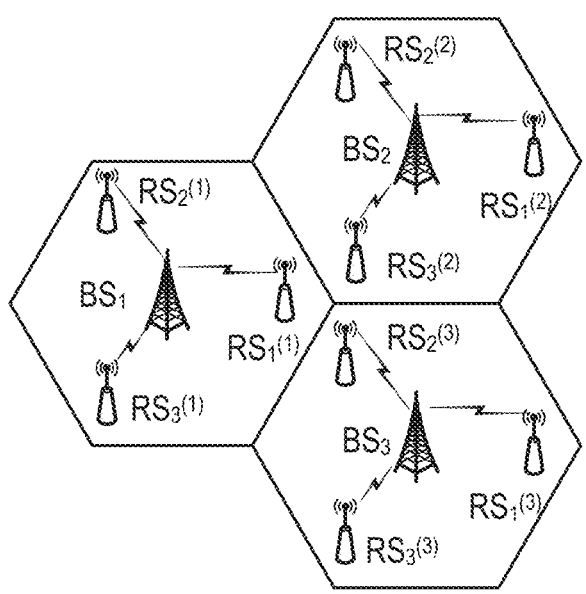
FIG. 21 is an explanatory diagram of a network topology of a specific embodiment in a wireless communication system according to this invention.

FIG. 21 is an explanatory diagram of a network topology of a specific embodiment in a wireless communication system according to this invention.

As illustrated in FIG. 21, assume that the network of the wireless communication system covers three cells, a base station is deployed at the center of each cell, respectively denoted by $BS_1$, $BS_2$, and $BS_3$, three relay nodes are deployed in each cell, the three relay nodes in the ith cell are respectively denoted by $RS1^{(i)}$, $RS2^{(i)}$, and $RS3^{(i)}$, and the cell radius is 500 meters.

Assume that each relay node is currently associated with the base station of the present cell as illustrated in FIG. 21. And assume that the neighboring base station of each relay node is the same as the related base station of the relay. Table 1 specifically lists neighboring/related base station(s) of each relay.

TABLE 1

| Relay node | Neighboring/ Related base station |
|---|---|
| $RS_1^{(1)}$ | $BS_1$, $BS_2$, $BS_3$ |
| $RS_2^{(1)}$ | $BS_1$ |
| $RS_3^{(1)}$ | $BS_1$ |
| $RS_1^{(2)}$ | $BS_2$ |
| $RS_2^{(2)}$ | $BS_2$ |
| $RS_3^{(2)}$ | $BS_1$, $BS_2$, $BS_3$ |
| $RS_1^{(3)}$ | $BS_3$ |
| $RS_2^{(3)}$ | $BS_1$, $BS_2$, $BS_3$, |
| $RS_3^{(3)}$ | $BS_3$ |

In addition, Table 2 lists the load of each base station/relay and the load of each cell and the blocking probability of each cell in the current network. The load is measured in the number of arrival users per second. The total blocking probability of network may be calculated according to the total load and blocking probability of each cell, as illustrated in Table 2. The blocking probability of network is calculated by weighted averaging the blocking probabilities of the cells using the load of each cell as a weight.

TABLE 2

| Cell number | Node | Node load | Cell load | Current blocking probability of cell | Blocking probability of network |
|---|---|---|---|---|---|
| 1 | $BS_1$ | 1.86 | 6 | 0.15 | 0.105 |
|   | $RS_1^{(1)}$ | 1.38 | | | |
|   | $RS_2^{(1)}$ | 1.38 | | | |
|   | $RS_3^{(1)}$ | 1.38 | | | |
| 2 | $BS_2$ | 0.31 | 1 | 0.01 | |
|   | $RS_1^{(2)}$ | 0.23 | | | |
|   | $RS_2^{(2)}$ | 0.23 | | | |
|   | $RS_3^{(2)}$ | 0.23 | | | |
| 3 | $BS_3$ | 1.24 | 4 | 0.06 | |
|   | $RS_1^{(3)}$ | 0.92 | | | |
|   | $RS_2^{(3)}$ | 0.92 | | | |
|   | $RS_3^{(3)}$ | 0.92 | | | |

Assume that the dynamic association control method is performed using the most reduction of blocking probability as a judgment criterion in the third embodiment. In this way, using the relay node $RS_1^{(1)}$ as an example, the relay node is currently associated with $BS_1$, its neighboring base stations include $BS_2$ and $BS_3$ in addition to $BS_1$. Therefore, according to the information sent from the related base stations ($BS_1$, $BS_2$, and $BS_3$) and the information collected by the relay node itself, the relay node assumes that the relay node itself respectively performs association with $BS_1$, $BS_2$, and BS$_3$, and calculates the blocking probability. The calculation result is as shown in Table 3.

TABLE 3

| Associated base station | Load and blocking probability of cell 1 | Load and blocking probability of cell 2 | Load and blocking probability of cell 3 | Blocking probability of network |
|---|---|---|---|---|
| BS$_1$ | 6, 0.15 | 1, 0.01 | 4, 0.06 | 0.105 |
| BS$_2$ | 4.62, 0.08 | 2.38, 0.03 | 4, 0.06 | 0.062 |
| BS$_3$ | 4.62, 0.08 | 1, 0.01 | 5.38, 0.12 | 0.093 |

As seen from Table 3, the relay node RS$_1^{(1)}$ is associated to BS2, and as compared with the current blocking probability, the reduction of blocking probability is the most, that is, 0.043. The other relay nodes respectively calculate the most reduction of blocking probability after the association thereof is changed, and the results are as shown in Table 4.

TABLE 4

| Relay node | The most reduction of block probability |
|---|---|
| RS$_1^{(1)}$ | 0.043 |
| RS$_2^{(1)}$ | 0 |
| RS$_3^{(1)}$ | 0 |
| RS$_1^{(2)}$ | 0 |
| RS$_2^{(2)}$ | 0 |
| RS$_3^{(2)}$ | 0 |
| RS$_1^{(3)}$ | 0 |
| RS$_2^{(3)}$ | 0.015 |
| RS$_3^{(3)}$ | 0 |

Each relay node sends its own related base stations the most reduction of virtual blocking probability under assumption that its association is changed. Table 5 shows the reduction of blocking probability received by each of the base stations from their related relay nodes. Each of the base stations selects a relay node whose reduction of blocking probability is the largest and is greater than 0, and replies acknowledgement information to it. Table 5 meanwhile shows the relay node selected by each of the base stations to which the acknowledgement information is replied.

TABLE 5

| Base station | Relay (reduction of blocking probability of the relay) | Relay selection |
|---|---|---|
| BS$_1$ | RS$_1^{(1)}$ (0.043), RS$_2^{(1)}$ (0), RS$_3^{(1)}$ (0), RS$_3^{(2)}$ (0), RS$_2^{(3)}$ (0.015) | RS$_1^{(1)}$ |
| BS$_2$ | RS$_1^{(2)}$ (0), RS$_2^{(2)}$ (0), RS$_3^{(2)}$ (0), RS$_1^{(1)}$ (0.043), RS$_2^{(3)}$ (0.015) | RS$_1^{(1)}$ |
| BS$_3$ | RS$_1^{(3)}$ (0), RS$_2^{(3)}$ (0.015), RS$_3^{(3)}$ (0), RS$_1^{(1)}$ (0.043), RS$_3^{(2)}$ (0) | RS$_1^{(1)}$ |

Since the relay node RS$_1^{(1)}$ receives the acknowledgement information from all the related base stations thereof, the relay node RS$_1^{(1)}$ makes a decision to change the association and changes the association relation to the base station BS2 capable of reducing the blocking probability most. After the association is changed, the total blocking probability of network is reduced by 0.043.

The relay node RS$_1^{(1)}$ changes as above, and the blocking probability can be significantly reduced, such that the technical effects of implementing balanced load and improving quality of service can be achieved.

Although several embodiments of this invention have been described, these embodiments are presented as examples and are not intended to limit the scope of this invention. The new embodiments may be implemented in a wide variety of other ways, and various omissions, substitutions, and modifications may be made to the embodiments without departing from the scope of the subject matter of this invention. These embodiments or their variations are included in the scope or subject matter of this invention, and are also covered within the scope of this invention recited in the claims and equivalents thereof.

What is claimed is:

1. A wireless communication system comprising:
   one or more base stations; and
   one or more relay nodes, wherein each of the one or more relay nodes is communicatively coupled to one or more base stations;
   wherein a processor of each of the one or more relay nodes:
   acquires information related to an object relay node and to candidate base stations to be associated;
   calculates respectively candidate blocking probabilities in a case where the object relay node performs an association with each of the candidate base stations to be associated according to the information acquired; and
   compares the candidate blocking probabilities with current blocking probabilities respectively,
   selects a candidate blocking probability having a maximum reduction of a total block probability as compared with the current blocking probability as an object blocking probability,
   selects the object blocking probability from the candidate blocking probabilities calculated, and
   selects an object base station from the one or more base stations based on the object blocking probability selected, and
   transfers the association of the object base station, so that the object relay node is associated with the object base station to which the association is transferred.

2. The wireless communication system according to claim 1, wherein, the processor of each of the relay nodes further:
   calculates a current total block probability by adding each of the current blocking probabilities of each of the base stations which is weighted by a load of each cell, and a total block probability after the association is transferred by adding each of the blocking probabilities of each of the base stations which is weighted by a load of each cell, and calculate the reduction of the total block probability.

3. The wireless communication system according to claim 1, wherein, the processor of each of the relay nodes further:
   determines whether a reduction of the selected object blocking probability is greater than a predetermined threshold, and causes the object relay node to change to be associated with the object base station to which the association is transferred only in a case where the reduction is greater than the predetermined threshold.

4. A dynamic association control method performed in a wireless communication system which includes base stations and relay nodes associated with the base stations, the dynamic association control method comprising:
   an information acquisition step for acquiring information related to an object relay node and to candidate base stations to be associated;
   a blocking probability calculation step for calculating respectively candidate blocking probabilities in a case where the object relay node performs associations with each of the candidate base stations to be associated according to the information acquired; and an association control step for comparing the candidate blocking probabilities with current blocking probabilities respectively, selecting a candidate blocking probability having a largest reduction of a total block probability as compared with the current blocking probability as an object blocking probability, selecting the object blocking probability from the candidate blocking probabilities calculated, and using a base station corresponding to the object blocking probability selected as an object base station to which the association is transferred, so that the object relay node is associated with the object base station to which the association is transferred.

5. The dynamic association control method of claim 4, wherein,
  in the association control step, a current total block probability is calculated by adding each of the current blocking probabilities of each of the base stations which is weighted by a load of each cell, and a total block probability after the association is transferred is calculated by adding each of the blocking probabilities of each of the base stations which is weighted by a load of each cell, and the reduction of the total block probability is calculated.

6. The dynamic association control method of claim 4, wherein,
  in the association control step, it is further determined whether a reduction of the object blocking probability selected is greater than a predetermined threshold, and the object relay node is caused to change to be associated with the object base station to which the association is transferred only in a case where the reduction is greater than the predetermined threshold.

7. The dynamic association control method of claim 4, further comprising a relay selection step for choosing the largest one from the block probability of a plurality of object relay nodes in a case where there is a plurality of the object relay nodes, and causing only an object relay node corresponding to the largest one to perform association transfer.

8. A wireless communication method performed in a wireless communication system which includes base stations and relay nodes associated with the base stations, the wireless communication method comprising:
  respectively acquiring, by the base stations and the relay nodes, information related to their respective communication environment;
  sending, by the base stations, the information acquired to each relay node which is capable of establishing association with the base stations; and
  selecting, by the relay nodes, candidate base stations to be associated from base stations except a currently associated base station, respectively calculating candidate blocking probabilities when a present relay node performs an association with each of the candidate base stations to be associated based on information from the base stations and the information acquired, comparing the candidate blocking probabilities with candidate blocking probabilities calculated by the present relay node respectively, selecting a candidate blocking probability having a largest reduction of a total block probability as compared with the current blocking probability as an object blocking probability, using a base station corresponding to the object blocking probability as an object base station to which the association is transferred, and changing from current association with a base station to association with the object base station to which the association is to be transferred.

9. The wireless communication method according to claim 8, wherein,
  the relay nodes adds each of the current blocking probabilities of each of the base stations which is weighted by a load of each cell, calculates a current total block probability and a total block probability after the association is transferred, and calculates the reduction of the total block probability.

10. The wireless communication method according to claim 8, wherein,
  one or more of the relay nodes sends the object blocking probability selected to all related base stations referring to a base station whose blocking probability is affected when associated base stations of the one or more of the relay nodes is changed;
  the associated base station selects, from a plurality of object relay nodes sending the blocking probabilities, an object relay node which permits the association to be transferred, and sends acknowledgement information to the object relay node; and
  the one or more of the relay nodes from current association with the base station to association with the object base station to which the association is transferred only in a case where the acknowledgement information is received from all related base stations.

11. The wireless communication method according to claim 8, wherein,
  one or more of the relay nodes sends the largest reduction of blocking probability to all related base stations referring to a base station whose blocking probability is affected when associated base stations of the one or more of the relay nodes is changed;
  the associated base station selects, from a plurality of object relay nodes sending the largest reductions of blocking probability, an object relay node which permits the association to be transferred, and sends acknowledgement information to the object relay node; and
  the one or more of the relay nodes changes from being associated with the current base station to association with the object base station to which the association is transferred only in a case where the acknowledgement information is received from all related base stations.

12. The wireless communication method according to claim 8, further comprising:
  determining, by the one or more relay nodes, whether a reduction of the object blocking probability selected which is compared with the current blocking probability is greater than a predetermined threshold, and changes to be associated with the object base station to which the association is transferred only in a case where the reduction is greater than the predetermined threshold.

* * * * *